United States Patent [19]
Griesmer et al.

[11] Patent Number: 5,555,405
[45] Date of Patent: Sep. 10, 1996

[54] METHOD AND APPARATUS FOR FREE SPACE MANAGEMENT IN A FORWARDING DATABASE HAVING FORWARDING ENTRY SETS AND MULTIPLE FREE SPACE SEGMENT QUEUES

[75] Inventors: Martin E. Griesmer, Arlington; David Benson, Acton, both of Mass.

[73] Assignee: Digital Equipment Corporation, Maynard, Mass.

[21] Appl. No.: 88,013

[22] Filed: Jul. 6, 1993

[51] Int. Cl.⁶ ............................................. G06F 12/02
[52] U.S. Cl. ............ 395/600; 370/85.13; 364/DIG. 2; 364/940.62; 364/970
[58] Field of Search ................................ 395/425, 600, 395/492; 370/85.13, 85.14, 94.1; 340/825.52, 825.02, 825.07

[56] References Cited

U.S. PATENT DOCUMENTS

| | | | |
|---|---|---|---|
| 4,695,949 | 9/1987 | Thatte et al. | 395/600 |
| 4,797,810 | 1/1989 | McEntee et al. | 395/425 |
| 4,933,937 | 6/1990 | Konishi | 370/85.13 |
| 5,025,367 | 6/1991 | Gurd et al. | 395/600 |
| 5,027,350 | 6/1991 | Marshall | 370/85.13 |
| 5,088,036 | 2/1992 | Ellis et al. | 395/425 |
| 5,109,336 | 4/1992 | Guenther et al. | 395/600 |
| 5,121,495 | 6/1992 | Nemes | 395/600 |
| 5,247,634 | 9/1993 | Cline et al. | |
| 5,339,411 | 8/1994 | Heaton, Jr. | 395/600 |

OTHER PUBLICATIONS

Tremblay, Jean–Paul et al., "An Introduction to Data Structures with Applications," 2d Ed, 1984 by McGraw–Hill, Inc., pp. 498–535.

Cohen, Jacques, "Garbage Collection of Linked Data Structures," Computing Surveys, vol. 13, No. 3, 1981, pp. 341–367.

*Primary Examiner*—Paul V. Kulik
*Attorney, Agent, or Firm*—David A. Dagg; A. Sidney Johnston; Arthur Fisher

[57] ABSTRACT

A forwarding information management system for a bridge or router is disclosed, including a method and apparatus for merging free space segments in a forwarding table. The forwarding table is allocated into forwarding entry sets and free space queues. Each forwarding entry set must be within a single contiguous block of the forwarding table memory. A set of free queues is used to manage the free space segments in the forwarding table that are not allocated into forwarding entries. Each free queue maintains pointers to free space segments of a particular size. The forwarding table becomes fragmented as forwarding entries are added. A table packing process is triggered by a predetermined trigger to merge small areas of free space into large areas of free space, making consecutive forwarding entry sets contiguous in order to combine small areas of free space into larger ones. The table packing process moves the forwarding entry sets in atomic operations to ensure that forwarding entry sets remain valid during the moves, thus allowing forwarding decisions to be made based on forwarding information within the forwarding entry set being moved while the forwarding entry set is being moved. The table packing process further ensures that the forwarding entry sets are efficiently moved such that they are accessible to the hardware frame forwarding apparatus, which is optimized to only read forwarding entry sets that do not cross memory page boundaries.

12 Claims, 14 Drawing Sheets

| 42 | 43 | 44 | 45 | 46 | 47 | 48 | 49 | 50 |

METHOD AND APPARATUS FOR FREE SPACE MANAGEMENT IN A FORWARDING DATABASE HAVING FORWARDING ENTRY SETS AND MULTIPLE FREE SPACE SEGMENT QUEUES

FIELD OF THE INVENTION

The invention relates generally to database management, and more particularly to management of frame forwarding information in bridges and routers.

BACKGROUND

In communications systems, Local Area Networks (LANs) provide communication between a limited number of stations located within a limited geography. A single LAN is known as a LAN segment, and a group of LANs joined together by one or more bridges or routers is known as an extended LAN. A typical LAN segment may connect hundreds of stations over a distance of several kilometers. A bridge or router may be used to connect multiple LAN segments, providing communication between a larger number of stations over a larger area, and preventing excessive local traffic from degrading overall network performance. In the text below, the term "bridge" is meant to indicate either a bridge or router.

A bridge monitors the traffic on all the LAN segments to which it is attached, and determines a destination segment (or segments) for each received frame. The determination of a destination segment for a received frame is hereinafter referred to as a "forwarding decision". The bridge uses the addressing information in the received frame to locate forwarding information in a forwarding database to make the forwarding decision for that received frame.

Forwarding decisions must be made at the maximum frame transmission rate of the attached LAN segments. Otherwise the bridge is a limitation on network throughput. To meet this performance requirement, especially where high speed fiber optic based LANs are used, forwarding decisions are commonly done in customized frame forwarding hardware, known as Application Specific Integrated Circuits (ASICS).

The addressing information of each frame consists of various address fields within the frame, including a destination station address. The forwarding information for a station address is contained in a forwarding entry for that station address. Each forwarding entry contains an address field and a forwarding information field. The forwarding information field contains forwarding information for frames addressed to the station address in the address field. As stations are added to and removed from the LAN segments attached to the bridge or router, forwarding entries are added and deleted from the forwarding database.

In known forwarding database designs, the forwarding database is designed as an ordered list. When a new station address is added to the forwarding database, a binary search is performed to find the location for the new forwarding entry. Potentially all the current forwarding entries must be moved to accommodate the new forwarding entry. Such implementations require excessive processing resources, and are not practical in environments with frequent additions of new station addresses, and where the forwarding database is very large.

Other known forwarding database designs use Content Addressable Memory (CAM) to store the forwarding database. However, CAM based implementations are often prohibitively costly in terms of circuit complexity and expense.

In other forwarding database designs, forwarding entries for sets of related addresses are grouped into variable sized forwarding entry sets. Each forwarding entry set consists of a contiguous block of memory within a forwarding table, and contains forwarding entries for a set of related addresses. When a forwarding entry is added, the forwarding entry set for that forwarding entry requires a larger segment of forwarding table memory. If the forwarding entry set cannot grow in its current location, a new segment of forwarding table memory must be allocated. The forwarding entry set is then moved to the new segment. The original location of the forwarding entry set becomes free memory space, and may subsequently be allocated to another forwarding entry set.

Over time, as forwarding entries are added to the forwarding database, and large segments of forwarding table memory are allocated to accommodate the larger forwarding entry sets, the number of small free segments of forwarding table memory increases, and the number of large free memory segments decreases. This is known as memory fragmentation. Memory fragmentation eventually results in a deficiency of large free memory segments. Thereafter, when a new forwarding entry is added to the forwarding database, there may be no contiguous free memory segment large enough to store the new forwarding entry set containing the forwarding entry for the new address. This event may occur even though the total amount of free memory in the forwarding table is sufficient to store the forwarding entry set, but the free memory is broken up into many small non-contiguous segments. Therefore, memory fragmentation results in poor utilization of forwarding table memory space, and puts an artificial limit on the number of forwarding entries that can be stored in the forwarding database. An efficient forwarding database design therefore requires a method to reduce memory fragmentation.

The necessity of using ASICs to perform forwarding decisions in bridges for newer high speed LANS introduces further requirements on forwarding database designs. Generally in ASIC design, the more logic gates in the design, the higher the cost of the implementation. Moreover, the more circuit complexity within the ASIC, the greater the development time, and amount of testing and verification required before the ASIC can be brought to market. Therefore limiting complexity of the circuit design, and limiting the number of gates in each ASIC are design priorities to reduce the cost of the ASIC, the time to bring the ASIC to market, and the probability of design failure.

In modern ASIC design, multiple logic processes exist within the ASIC, each logic process performing a specific function. Logic processes communicate with other logic processes and outside the device through registers. Registers create circuit complexity, and add to the number of gates within the ASIC. Accordingly, minimizing the size and number of registers in the ASIC reduces the ASIC cost.

While forwarding decisions are made by the forwarding ASIC, forwarding table management is done in parallel by software running on a microprocessor. Thus the forwarding table may be accessed to perform a forwarding decision while the memory fragmentation within the forwarding table is being reduced. A method to reduce memory fragmentation must assure that the forwarding entry sets within the forwarding table are not invalid. Otherwise, forwarding decisions could not be made, and received frames would not be forwarded, or possibly, forwarded incorrectly.

Finally, where forwarding database management is performed by a process running on a microprocessor, the management process must be triggered to reduce fragmentation before the forwarding table is highly fragmented. And the management process should terminate without causing other processes that require the microprocessor to be unable to make to progress for an excessive period of time.

For these reasons and others, a high speed bridge having a free space collection system is required, which reduces memory fragmentation within the forwarding database of the bridge, limits the number of gates required in the forwarding ASIC, and maintains the validity of the forwarding entry sets during operation so that forwarding decisions can be made in parallel. The free space collection method should be triggered prior to memory fragmentation becoming extreme, and should execute such that shared resources can be used by other processes, and starvation does not result.

SUMMARY

In accordance with principles of the invention, there is provided a forwarding database management system, where forwarding entries are stored in a forwarding table consisting of various sized forwarding entry sets and free space segments. Each forwarding entry set contains forwarding entries for a related set of addresses.

A plurality of free queues are used to locate free space segments in the forwarding table based on their size. Each free queue has an associated free space segment size. Each queue element within a given free queue contains a pointer to a free space segment of size equal to the free space segment size associated with that free queue.

A forwarding table packing process collects smaller free space segments into larger free space segments. This process makes those valid forwarding entry sets contiguous with each other. The packing process reclaims fragmented free space in the forwarding table by scanning the database from the top and locating the first free space segment. It then migrates the free space segment downward through the database, merging the free space segment with other free space segments. Free space segments are merged by moving ("packing") forwarding entry sets to cause multiple free space segments to be combined. As free space segments are merged, they are removed from their free queues. When a suspension condition occurs, the packing process temporarily relinquishes the CPU to allow other processes to make progress. At some time after the packing process is suspended, the packing process automatically resumes execution on the CPU. When a termination condition occurs, the packing process terminates execution. Following the occurrence of a termination condition, the packing process will not execute until a trigger condition occurs. The free space segment being migrated is known as the working free space segment.

The packing process is initiated when a trigger condition is present. Each time there is a modification to the forwarding table, for example when a new forwarding entry is added or when an existing forwarding entry is deleted, a trigger function determines whether a trigger condition is present. An example trigger condition is present when the number of free space segments in the free queue with the largest associated free space segment size drops below a minimum number and one or more of the free queues with smaller associated free space segment size has more than a maximum number of free space segments. If it is determined that a trigger condition is present and the packing process is already scheduled, no trigger is issued. Thus, the packing process is initiated automatically whenever a trigger condition occurs, and the packing process is not already scheduled.

A forwarding ASIC is used to make forwarding decisions for received packets. The forwarding ASIC can access forwarding entry sets throughout the forwarding table. However, as a result of advantageous circuit design within the forwarding ASIC, the forwarding ASIC cannot process forwarding entry sets that cross block boundaries. Because no forwarding entry set can cross a block boundary, the packing process makes adjustments when migrating a free space segment down the forwarding table. If the next forwarding entry set cannot be copied into the current location of the migrating free space segment, because the result would cause the forwarding entry set to cross a block boundary, the packing process leaves a free space segment at the end of the block. A pointer to the free space segment at the end of the block is added to a private list of free space segments maintained by the packing process.

As the packing process continues to migrate the free space segment down the forwarding table, it increases the size of the working free space segment by relocating forwarding entry sets that separate the existing free space segments. The relocation of a forwarding entry set is always performed as an atomic operation, such that the forwarding entry set is valid at all times, and forwarding decisions can be made by the forwarding ASIC based on the forwarding information within the forwarding entries in the forwarding entry set at all times.

When the packing process determines that the next forwarding table segment following the current working free space segment is a free space segment, that free space segment is automatically merged into the working free space segment. When the packing process determines that the next segment following the current working free space segment is a forwarding entry set, the packing process either moves the forwarding entry set to a free space segment within the private list of free space segments, or it moves the forwarding entry set partially or completely into the working free space segment. If there is a free space segment on the private list of free space segments of size equal to or greater than the size of the forwarding entry set is moved into that free space segment, rather than into the working free space segment.

If there is no free space segment on the private list of free space segments of size equal to or greater than the size of the forwarding entry set to be moved, the forwarding entry set is moved either partially or completely into the working free space segment. If the working free space segment is equal in size to, or larger than the forwarding entry set to be moved, the packing process moves the forwarding entry set completely into the working free space segment, using a single copy operation. During a single copy operation, the forwarding ASIC makes forwarding decisions based on the contents of the forwarding entry set by accessing the forwarding entry set in its original position. Subsequent to the single copy operation, the forwarding ASIC makes forwarding decisions based on the contents of the forwarding entry set by accessing the forwarding entry set in its new position.

If the working free space segment is of size less than the forwarding entry set to be moved, then the forwarding entry set is partially moved into the working free space segment, using a double copy operation. During a double copy operation, the packing process first copies the forwarding entry set to a scratch pad area. While the forwarding entry set is being copied to the scratch pad area, the forwarding ASIC makes forwarding decisions based on the contents of the forwarding entry set by accessing the forwarding entry set in its original position. The packing process then does a second copy by copying the forwarding entry set partially into the working free space segment, and partially over the previous locations of the forwarding entry set within the forwarding table. During the second copy, the forwarding ASIC makes forwarding decisions based on the contents of the forwarding entry set by accessing the forwarding entry set within the scratch pad area. After the second copy is completed, the forwarding ASIC makes forwarding decisions based on the contents of the forwarding entry set by accessing the forwarding entry set in its new location within the forwarding table.

Under certain conditions, the packing task is not allowed to run to completion. Generally, the packing task only operates on a predetermined number of blocks at a time, before suspending itself to allow other processes to execute on the CPU. When it is suspended, the packing process saves a pointer to where it stopped within the forwarding table, and a pointer to the position of the working free space segment. Subsequent to being suspended, the packing process is automatically resumed.

The packing process completes operation and terminates execution by reaching the end of the used portion of the forwarding table. When the packing process terminates, it returns all of the free space it has in its private list of free space segments to the public free space queues. Subsequent to the packing process terminating, it only executes again after a trigger condition is present.

In an alternative embodiment, each time it is suspended, the packing task reduces the size of the working free space segment by breaking it up into free space segments of the appropriate size to enter into the free space queues.

In a first example embodiment, the packing process is implemented as a program executing on a microprocessor within a bridge or router. The forwarding table and plurality of free queues are contained in a memory on the bridge or router.

In a second example embodiment, the memory on the bridge or router further contains a hash table. The hash table consists of hash table entries, each hash table entry containing a pointer to a forwarding entry set within the forwarding table. The index of each hash table entry is a first field of a hash output obtained by applying a hash function to an input address. The forwarding entry set indicated by a given hash table entry contains forwarding entries for those input addresses having hash outputs with equivalent hash table indices.

The pointers within the hash table entries are used to control where a forwarding entry set is accessed while the forwarding entry set is being moved by the packing process. In a single copy operation, the packing process modifies the pointer within the hash table entry pointing to the forwarding entry set to point to the new position of the forwarding entry set after the forwarding entry set has been copied to the new position. In a double copy operation, the packing process modifies the pointer within the hash table entry pointing to the forwarding entry set to point to the location within the scratch pad where the forwarding entry has been copied after the first copy, and then modifies the pointer again to point to the new location of the forwarding entry set in the forwarding table after the second copy is completed.

The forwarding table, free queues and hash table may be standard RAM components, and no complex CAM logic is required. The add and delete entry processes may be implemented as software, firmware, or microcode, executing on a node microprocessor, or as an application specific integrated circuit (ASIC).

Fragmentation of the forwarding table is reduced, resulting in improved forwarding table utilization. Forwarding entry sets are able to grow in size without being limited by lack of free space segments in the forwarding table caused by fragmentation, and more forwarding entries may be added to the forwarding table. The block boundaries within the forwarding table created by optimization of the forwarding ASIC are accommodated for by the packing process, so that forwarding entry sets are not moved such that they cross a block boundary. The packing process is initiated prior to fragmentation becoming extreme, and does not monopolize shared resources. In addition, the packing process merges the free space segments in the forwarding table without causing existing forwarding entry sets to become invalid.

These and other features and advantages of the present invention will become apparent from a reading of the detailed description in conjunction with the attached drawings in which like reference numerals refer to like elements in the several views.

DETAILED DESCRIPTION

Figure 1:
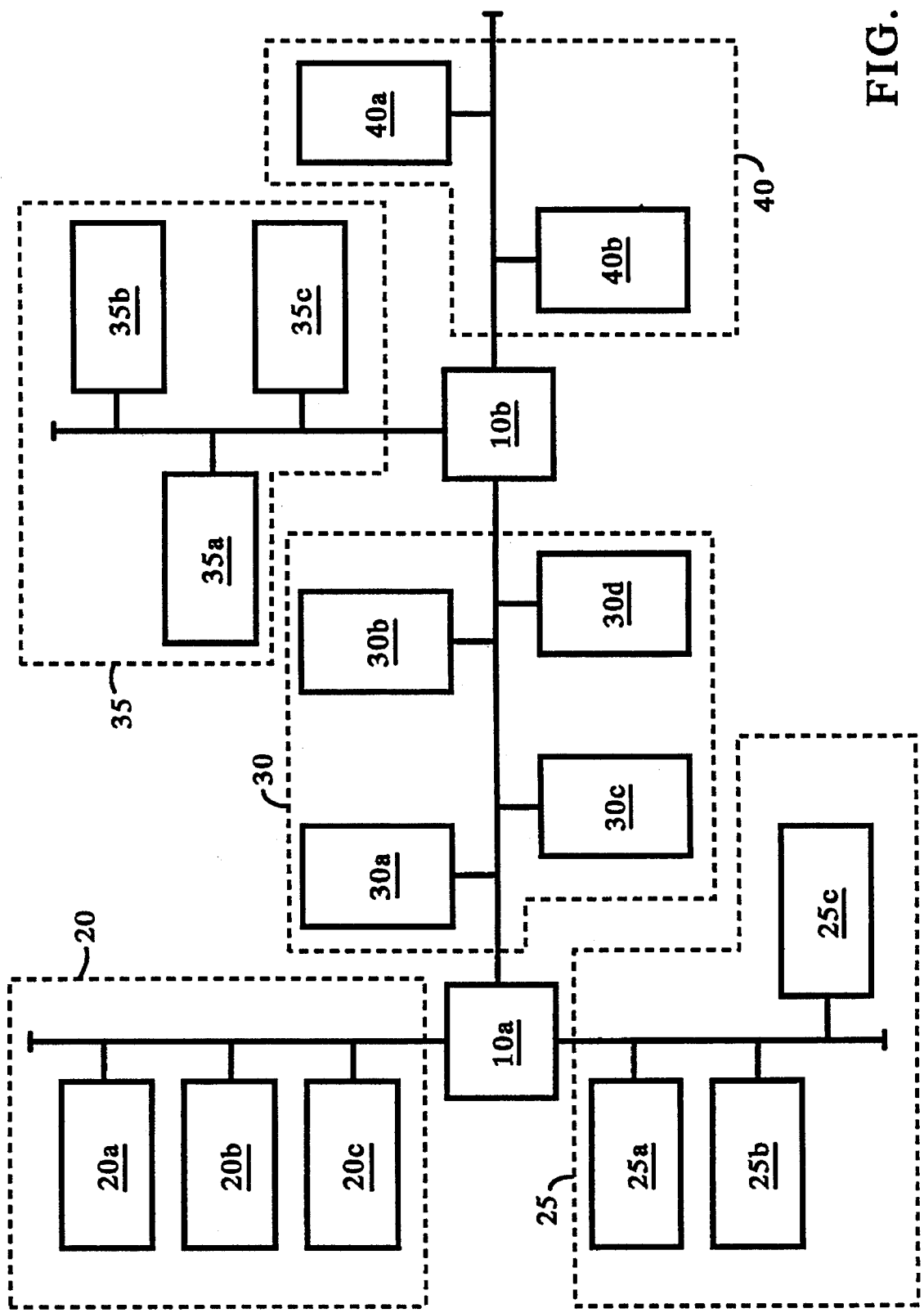
FIG. 1 is a block diagram of an extended local area network (LAN)

FIG. 1 is a block diagram of an extended local area network (LAN). FIG. 1 shows bridges 10a, and 10b interconnecting LAN segments 20, 25, 30, 35, and 40. LAN segments 20, 25, 30, 35 and 40 may be Ethernet, Token Ring, FDDI, or any other LAN protocol or technology. Network stations 20a, 20b, and 20c are within LAN segment 20, stations 25a, 25b and 25c are within LAN segment 25, stations 30a, 30b, 30c, and 30d are within LAN segment 30, stations 35a, 35b and 35c are within LAN segment 35, and stations 40a and 40b are within LAN segment 40. During operation of the elements in FIG. 1, stations sharing a common LAN segment communicate freely among themselves. Stations on different LAN segments require a bridge 10 to communicate.

For example, when station 20a wishes to send a message to station 40a, it builds a frame with a destination address equal to the station address of station 40a, and source address equal to the address of station 20a.

Station 20a then transmits the frame, and bridge 10a receives the frame. Bridge 10a searches its forwarding information database for a forwarding entry having forwarding information for the address found in the destination address field of the frame. If no such forwarding entry is found, bridge 10a broadcasts the frame to all LAN segments to which it is attached, except the LAN segment on which the frame was received. If the forwarding entry is found, it indicates that the frame should be forwarded to segment 30. In either case, bridge 10b receives the forwarded frame, makes a similar forwarding determination based on the addressing information in the frame, and forwards the frame to LAN segment 40. Station 40a then receives the forwarded frame originally transmitted by station 20a.

Figures 2, 4B:
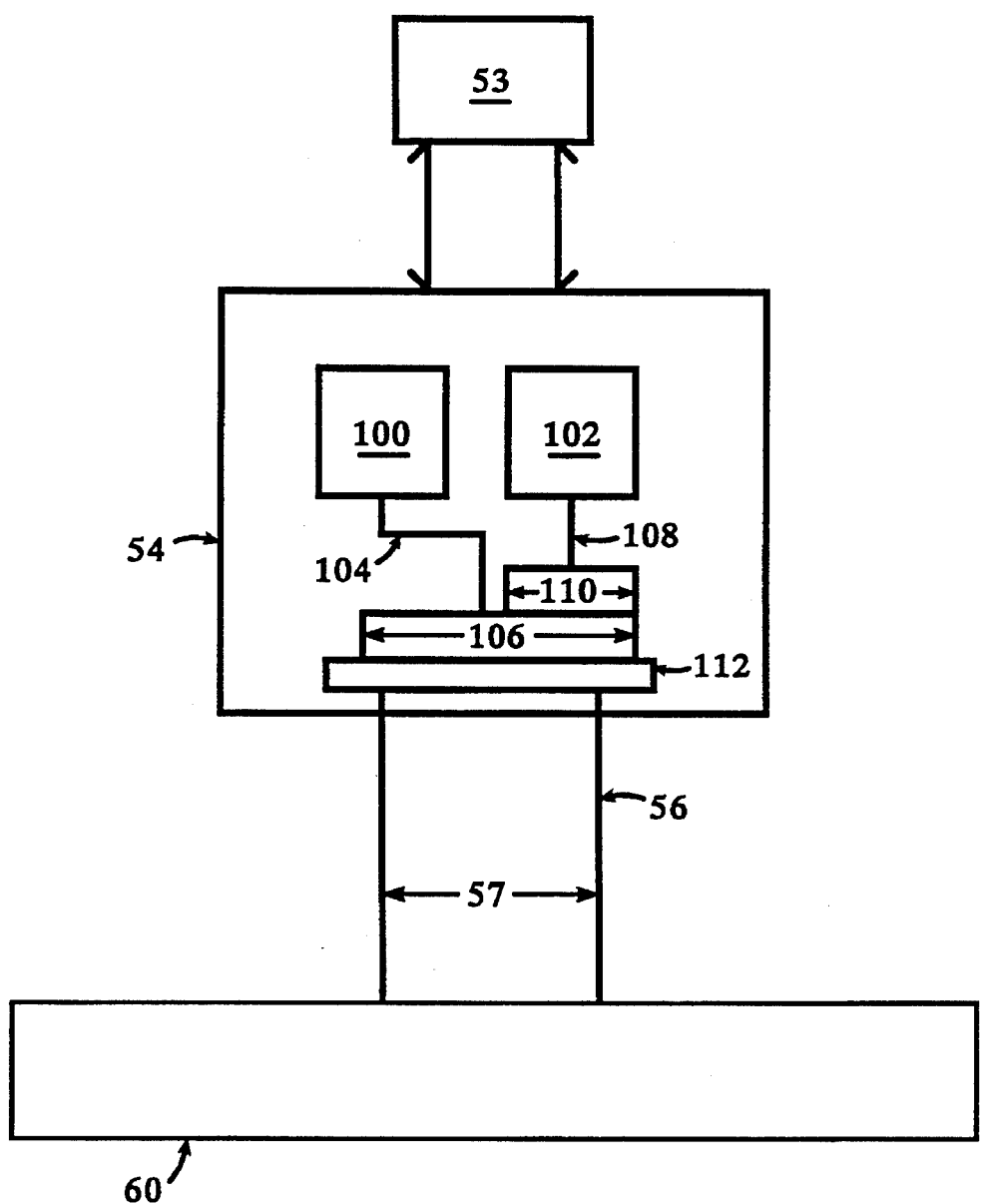
FIG. 2 is a diagram of a typical communications frame.
FIG. 4B is an expanded view of an example implementation of the frame forwarding circuit of FIG. 4A.

Network stations send information or messages to each other in the form of frames. FIG. 2 shows an example frame structure, having several fields. The start of the frame is denoted by a preamble field 42 and a start frame delimiter field 43 which further denotes the beginning of the frame. Start frame delimiter field 43 is followed by a frame control field 44, indicating whether the bit stream is a token or frame, and, if it is a frame, what type of frame it is.

The next two fields are destination address field 45, and source address field 46. Each station within a LAN has a unique station address. Destination address field 45 generally contains a station address of the intended recipient of the frame, while source address field 46 contains the station address identifying the source of the frame.

Destination address field 45 and source address field 46 are part of what is known as the addressing information of a frame. Frame formats other than that shown in FIG. 2 may contain additional addressing information in other fields.

An information field 47 follows the source address field 46, and is in turn followed by a frame check sequence field 48 containing an error detection sequence used by the receiving stations to detect errors in the frame control field 44, destination address field 45, source address field 46, or information field 47. The end of the frame is denoted by an end delimiter 49, which defines the end of the frame, and a frame status flag field 50 containing a set of status flags.

A. Collecting Free Space Segments

Figure 3:
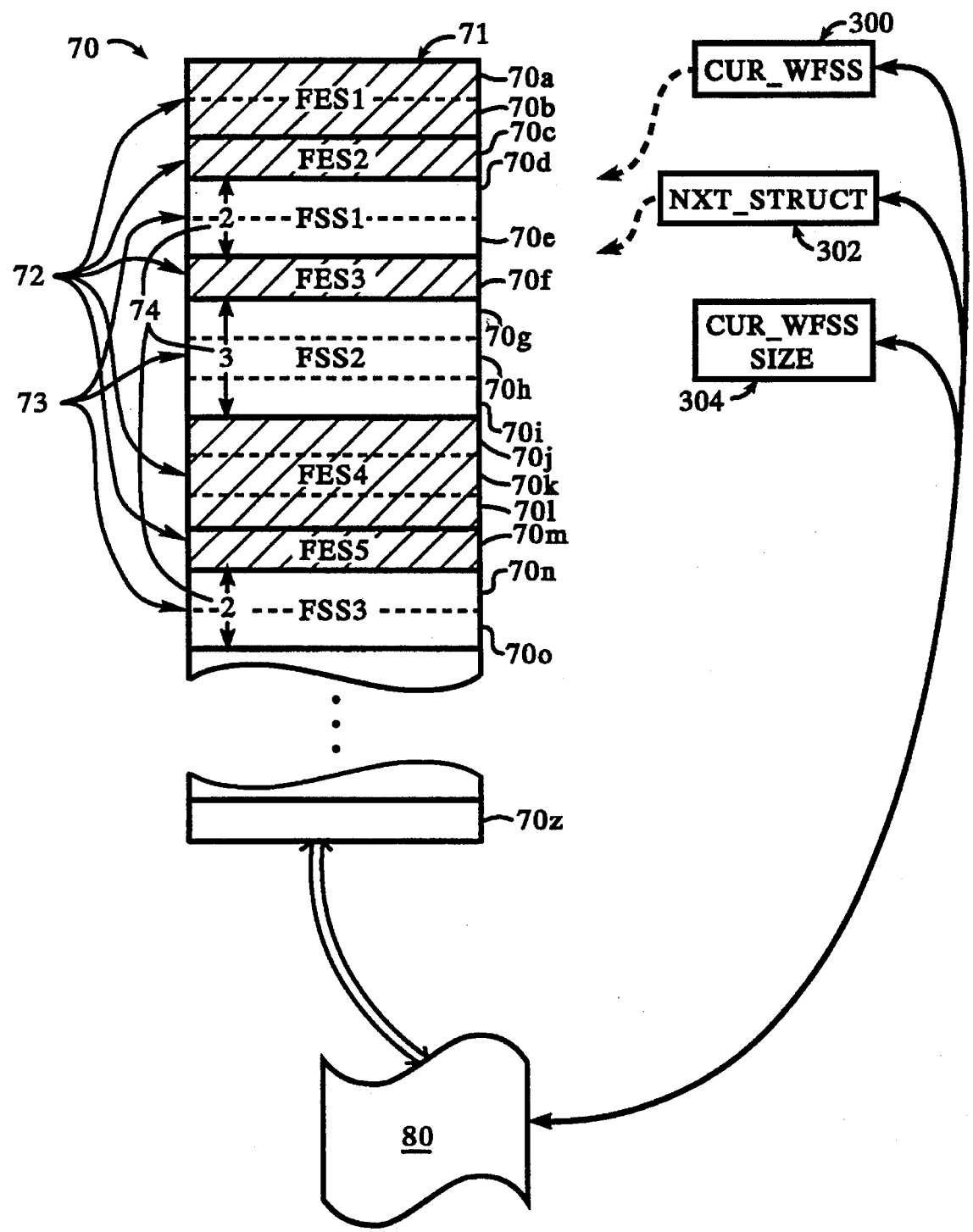
FIG. 3 is a diagram of elements in an apparatus for free space collection.

FIG. 3 is a diagram showing an example embodiment of the elements of an apparatus for free space collection in an address translation database. FIG. 3 shows a forwarding table 70 consisting of words 70a, 70b, 70c . . . 70z, organized into forwarding entry sets 72 (FES1, FES2, FES3, FES4 and FES5) of different sizes, each one of the forwarding entry sets 72 containing one or more forwarding entries for a set of one or more related addresses. The size of each one of forwarding entry sets 72 is the number of forwarding entries it contains, and the size of each forwarding entry is equal to one word.

Those words 70a, 70b, 70c . . . 70n not within forwarding entry sets 72 are organized into free space segments 73 (FSS1, FSS2, and FSS3), each one of free space segments 73 having a size 74, the size 74 being the number of words in that free space segment. FIG. 3 further shows a forwarding table packing process (referred to hereinafter as "packing process") 80. The packing process 80 is shown having access to the forwarding table 70.

In a first embodiment of the elements in FIG. 3, the packing process 80 uses a pointer 300 to indicate the current working free space segment, in this case initially pointing to FSS1 beginning at word 70d. Also in the first embodiment, the packing process 80 uses a pointer 302 to indicate the next structure following the current working free space segment, in this case initially pointing to FES3 at word 70f. Further in the first embodiment, the packing process 80 uses a size variable 304 to maintain the current size of the working free space segment.

During operation of the elements shown in FIG. 3, the packing process 80 combines free space segments 73 to increase the number of larger free space segments. The packing process 80 begins at the top 71 of the forwarding table 70, and locates the first one of the free space segments 73, in this case FSS1. The packing process 80 then locates the next segment following FSS1, in this case forwarding entry set FES3. The packing process 80 next determines if the private list of free space segments contains a free space segment large enough to store FES3. In the example of FES3, the private list of free space segments is empty, and therefore does not contain a free space segment large enough to store FES3.

Next in the example of FIG. 3, the packing process determines that the size of the current working free space segment, in this example FSS1 of length 2, is larger than the length of FES3. Therefore, the free space segment FES3 can be moved into the first word of free space segment FSS1. The packing process 80 then copies forwarding entry set FES3 into the first word of free space segment FSS1, using a single copy operation. During a single copy operation, the forwarding decisions made based on the contents of the forwarding entry set, are made by accessing the forwarding entry set in its original position. Following the complete copying of the forwarding entry set to its new position, such forwarding decisions are made by accessing the forwarding entry set in its new position in the forwarding table in the first word of free space segment FSS1.

The packing process 80 then updates the working free space segment to consist of word 70e. The packing process 80 determines that the segment following the updated working free space segment is a free space segment, FSS2. The free space segment FSS2 is then automatically merged into the working free space segment. The packing process then updates the working free space segment to consist of words 70e, 70f, 70g, 70h, and 70i, thus having a length of 5. Thus during operation of the elements in FIG. 3, in the steps listed above, the packing process 80 makes the initially non-contiguous, consecutive forwarding entry sets FES2 and FES3 contiguous.

Figure 4A:
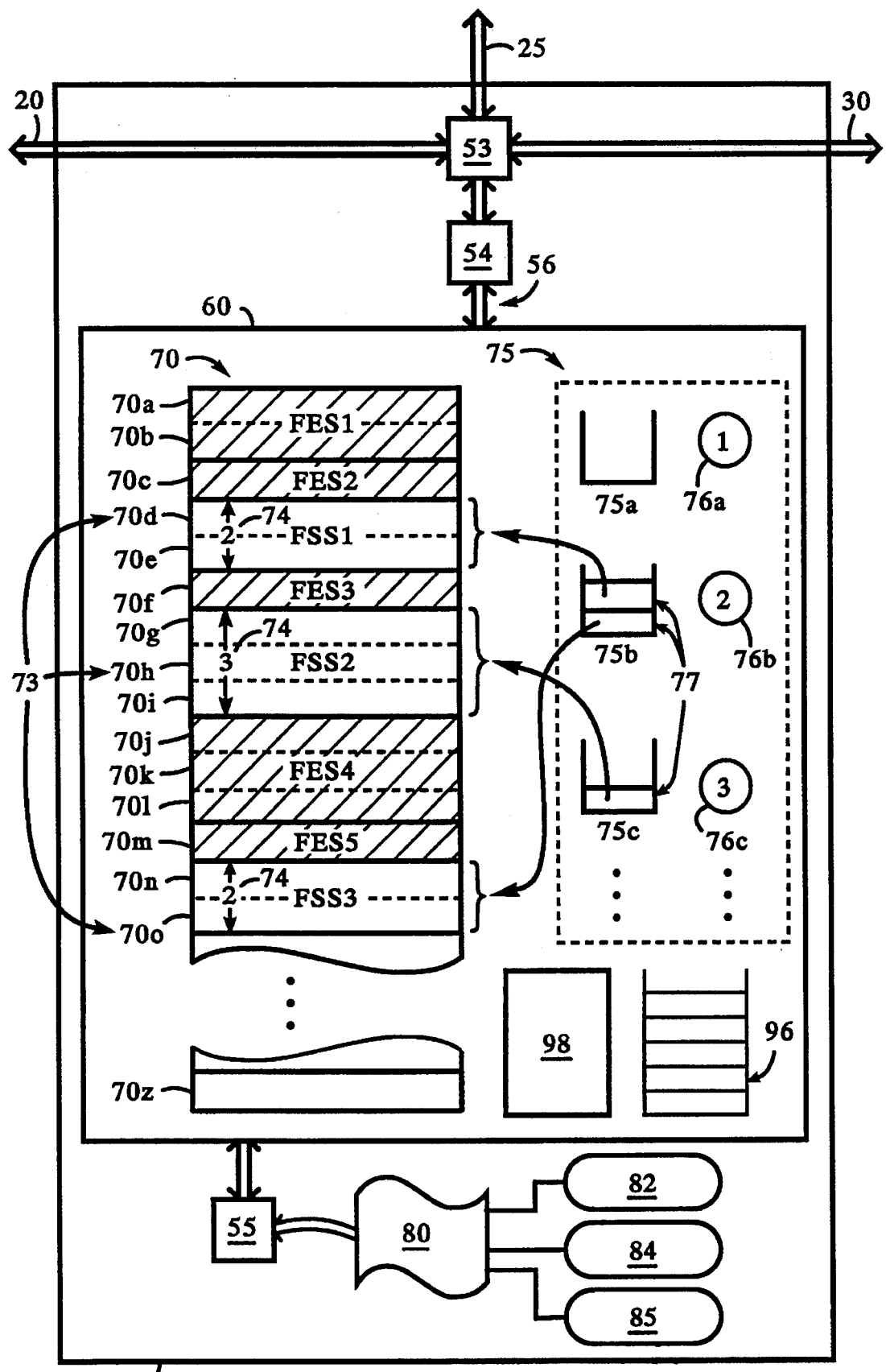
FIG. 4A is a diagram of an example embodiment of an apparatus for free space collection.

FIG. 4A shows an example embodiment of an apparatus for free space collection in an address translation database, within a bridge 10, coupled with LAN segments 20, 25 and 30. The bridge 10 includes a memory 60, a microprocessor 55, a transceiver circuit 53, a frame forwarding circuit 54, and a free space packing process 80 (hereinafter referred to as "packing process"). The memory 60 contains the forwarding table 70, and a plurality of free queues 75. The transceiver circuit 53 is coupled with the frame forwarding circuit 54 and the LAN segments 20, 25 and 30. The frame forwarding circuit 54 is coupled with the transceiver circuit 53, and is further coupled with the memory 60 via a memory bus 56. The packing process 80 is a program running on the microprocessor 55, and accesses the memory 60 via microprocessor 55.

The plurality of free queues 75 (75a, 75b, 75c . . . 75n), is shown having associated free space segment sizes 76 (76a, 76b, 76c . . . 76n). Each individual free queue (75a, 75b, 75c . . . 75n) contains zero or more queue elements 77. Each queue element 77 contains a pointer to one of free space segments 73 in forwarding table 70 of size 74 equal to the associated free space segment size (76a, 76b, 76c . . . 76n) of the free queue (75a, 75b, 75c . . . 75n). Accordingly, any one of the plurality of free queues 75 contains a queue element for each free space segment 73 having size 74 equal to the associated free space segment size 76 for that free queue. For example, free queue 75a has an associated free space segment size 76a of 1 (one). None of the free space segments 73 shown in FIG. 3 have size 74 equal to 1 (one), thus free queue 75a has no queue elements, and is therefore empty. Similarly, the queue elements in free queue 75b indicate free space segments FSS1 and FSS3, having size 74 of 2 (two), and the queue element in free queue 75c indicates FSS2 having a size 74 of 3 (three).

In a first embodiment, the queue elements themselves are contained within the corresponding free space segments, and connected by pointers, as a linked list.

In the first embodiment, the size of each one of the forwarding entry sets 72 is between 1 and a maximum number. The number of free queues in the plurality of free queues 75 is equal to that maximum number. For example, in an embodiment where the maximum size of each one of the forwarding entry sets 72 is seven, there are 7 free queues 75. The associated free space segment sizes 76 of each of the plurality of free queues 75 equal each of the possible sizes of the forwarding entry sets 72 In an embodiment where the maximum size of each one of the forwarding entry sets 72 is seven, the associated free space segment sizes 76 would therefore be 1,2,3,4,5,6 and 7.

Also shown in FIG. 4A are scratch pad 98, and private free space segment list 96. Scratch pad 98 is an area reserved within the memory 60 for use by the packing process 80. During operation, the packing process 80 uses the scratch pad 98 as temporary storage for forwarding entry sets that are moved to merge free space segments. The scratch pad 98 thus permits the packing process 80 to perform a double copy of the forwarding entry set being moved, and guarantee that forwarding decisions can be performed using the forwarding entries within the forwarding entry set while the forwarding entry set is being moved.

The packing process 80 adds a free space segment to the private free space list 96 when a free space segment cannot be immediately utilized, because moving a forwarding entry set into the free space segment would cause the forwarding entry set to cross a block boundary. In this situation, the remainder of the free space segment up to the block boundary is then added to the private free space segment list. The free space segments maintained in the private free space segment list are used to store forwarding entry sets that must be moved to merge free space segments, whenever there is a free space segment on the private free space list 96 of sufficient size to store the forwarding entry set being moved by the packing process 80.

During operation of the elements of FIG. 4A, the packing process 80 is triggered by trigger condition 82. Trigger condition 82 is present when the number of entries on the free queue with the largest associated free space segment size drops below a predetermined number, and the number of entries on one or more of the free queues with smaller associated free space segment size exceeds a predetermined maximum number. In an alternative embodiment, trigger condition 82 occurs each time a predetermined period of time expires. In a first embodiment, each time there is a modification to the forwarding table, for example when a forwarding entry is added to or deleted from the forwarding table, a trigger process determines whether a trigger condition is present.

After trigger condition 82 occurs, the packing process 80 locates the first free space segment in the forwarding table 70, in this case FSS1. Next, the packing process 80 removes the queue element 77 indicating FSS1 from the free queue 75b.

The packing process 80 then determines that the next segment following the current working free space segment is a forwarding entry set, in this case FES3. For purposes of example, there is no free space segment on the private list of free space segments 96 of size equal to or greater than the size of the forwarding entry set FES3.

Because there is no free space segment on the private list of free space segments 96 of size equal to or greater than the size of the forwarding entry set to be moved, the packing process 80 next determines whether FES3 can be completely moved into the working free space segment. In this example, the working free space segment is of size greater than the forwarding entry set to be moved, and therefore the packing process 80 moves the forwarding entry set completely into the working free space segment, using a single copy operation.

The packing process 80 moves the forwarding entry set FES3 into the first word of FSS1 (70d), thus creating a new working free space segment having length of 2, consisting of the forwarding table words 70e through 70f.

The packing process 80 next determines that the segment following the new working free space segment is a free space segment, in this example FSS2. The packing process 80 then merges FSS2 into the working free space segment, and removes FSS2 from the free queue 75c. The working free space segment then consists of words 70e, 70f, 70g, 70h, and 70i, having a length of 5.

Further during operation of the elements of FIG. 4A, the packing process 80 operates iteratively upon the forwarding table 70, making consecutive forwarding entry sets contiguous, and thus creating large free space segments by merging smaller free space segments. The packing process 80 continues executing as described above until either it is suspended or terminated. The packing process 80 is suspended when a suspension condition 84 occurs, and the packing process 80 is terminated when a termination condition 85 occurs. Examples of suspension conditions include expiration of a predetermined execution time period, or traversing a predetermined number of words within forwarding table 70. Examples of termination conditions are reaching the bottom of the forwarding table 70, or processing the last used portion of the forwarding table 70. In order to determine whether the last used portion of the forwarding table 70 has been processed, a pointer to the last used portion of the forwarding table 70 must be maintained. The last used portion of the forwarding table 70 is equal to the last forwarding entry of the last forwarding entry set in the forwarding table 70.

Following a suspension condition 84, the packing process 80 stores the position within the forwarding table 70 where it last located a free space segment, and allows other processes within the bridge to make progress by executing on the CPU. Subsequent to being suspended, the packing process 80 resumes execution automatically, based on the specific scheduling system of the particular implementation.

Following a termination condition 85, the packing process 80 distributes portions of the newly created free space segment into the largest free space queue 75n, and any remainder into other of the free space queues 75. The packing process 80 removes itself from any further scheduling following a termination condition 85, and will not be executed until another trigger condition occurs. In an alternative embodiment, the packing process 80 distributes portions of the newly created free space segment into the largest free space queue 75n, and any remainder into other of the free space queues, 75 both following suspension and termination conditions. As a further alternative embodiment, upon occurrence of a suspension condition, the packing process 80 returns a portion of the current working free space segment to the free space queues 75.

B. Forwarding ASIC Design

In a bridge for a high speed LAN, the ASIC designed to make forwarding decisions for received frames (hereinafter the "forwarding ASIC") uses a memory address register to assert memory addresses onto a memory address bus to access forwarding entries within the forwarding table. In order for the forwarding ASIC to access the whole forwarding table, the memory address register has sufficient bits to assert memory addresses throughout the entire forwarding table. Thus the number of bits in memory address register is logarithm base 2 of the size of the forwarding table. For example, if the forwarding table can contain 64k forwarding entries, the memory address register must have 16 bits.

Some logic engines within the ASIC do not access all the bits within the memory address register. For example, a first logic process calculates the full memory address of the forwarding entry set for a given station address, and loads the memory address into the memory address register. Control is then passed to a second logic process that locates the specific forwarding entry within the forwarding entry set. To limit circuit complexity, and reduce the number of gates, the second logic process is coupled with only a subset of the bits within the memory address register. The circuitry within the second logic process which searches a forwarding entry set to locate a specific forwarding entry only operates on a subset of the full memory address. The range of memory accessible to the second logic process is referred to as a memory "block".

For these reasons the efficient design of the forwarding ASIC within a bridge requires that forwarding entry sets not cross block boundaries. Memory fragmentation is increased in such designs, because free space segments within the forwarding table cannot be used to hold forwarding entry sets if the result would cause the forwarding entry set to cross a block boundary. The method to reduce memory fragmentation ensures that forwarding entry sets do not cross block boundaries.

FIG. 4B is an expanded view of an example embodiment of the frame forwarding circuit 54 from FIG. 4A. The transceiver 53 is shown coupled with the frame forwarding circuit 54. The frame forwarding circuit 54 is implemented as an Application Specific Integrated Circuit (ASIC) in a known embodiment. Within the frame forwarding circuit 54 are shown a first logic process 100 and a second logic process 102. Both the first logic process 100 and the second logic process 102 are coupled with a memory address register 112. The memory address register 112 is in turn coupled with the memory 60 via a memory bus 56, having a bit width 57. The first logic process 100 is coupled with the memory address register 112 via logic path 104, logic path 104 having a bit width 106, equal to the bit width 57 of the memory bus 56. The second logic process 102 is coupled with the low order bits of memory address register 112 via logic path 108, logic path 108 having a bit width 110, less than the bit width 57 of the address bus 56.

During operation of the elements in FIG. 4B, the frame forwarding circuit 54 locates a forwarding entry for a station address in a frame received by the transceiver 53. The first logic process 100 calculates a memory address of the forwarding entry set for the station address, and loads the memory address of the forwarding entry set into memory address register 112. The second logic process 102 locates the specific forwarding entry within the forwarding entry set, by manipulating the low order bits in the memory address register 112 through the second logic path 108.

Thus, the second logic path 108, and any address path within second logic process 102 need only be wide enough to traverse the maximum size forwarding entry set. For example, where the maximum forwarding entry set size is 32 words, the bit width of logic path 108 need only be equal to 5 bits. The second logic process 102 can therefore only access a single block of the forwarding table 70 at a time, each block consisting of 32 words. Forwarding entry sets that cross block boundaries cannot be processed by the forwarding circuit 54, because the second logic process 102 cannot manipulate any but the 5 lowest order bits of the memory address in the memory address register 112.

It is thus shown that where the forwarding circuit 54 is optimized to reduce circuit complexity in the second logic process 102 and 2nd logic path 108, forwarding entry sets within the forwarding table 70 cannot cross block boundaries. It will be evident to one skilled in the art of circuit design that block sizes may vary between different implementations.

C. Avoiding Block Boundaries

Figure 4C:
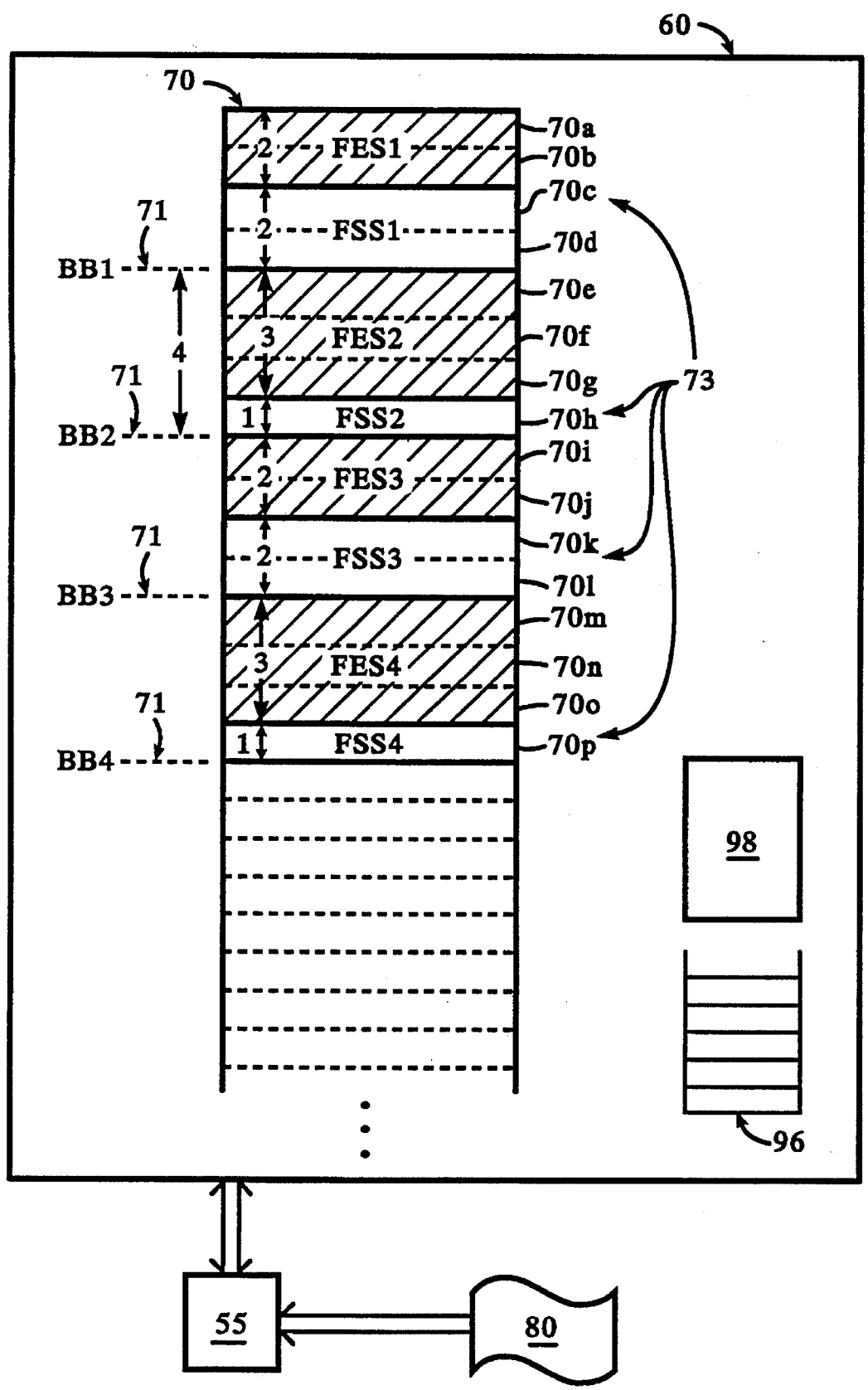
FIG. 4C is a diagram of an example embodiment of an apparatus for free space collection, showing block boundaries within the forwarding table.

FIG. 4C shows an example of the forwarding table 70 where circuit optimization in the frame forwarding circuit 54 create block boundaries 71 (BB1, BB2, BB3, and BB4). As noted above, circuit optimization in the frame forwarding circuit 54 result in the requirement that forwarding entry sets cannot cross block boundaries. Block boundaries 71 occur after every fourth word. The forwarding table 70 has forwarding entry sets FES1 through FES4, and free space segments FSS1 through FSS4. The packing process 80 is a process executing on microprocessor 55, and has access to the memory 60 via the microprocessor 55. The memory 60 includes the forwarding table 70, the scratch pad 98, and the private free space segment list 96.

During operation of the elements in FIG. 4C, the packing process 80 begins at the top 71 of the forwarding table 70 and merges together free space segments 73 by moving forwarding entry sets. The packing process 80 first locates the first free space segment FSS1. The packing process 80 then determines whether the forwarding table segment following the first free space segment is a forwarding entry set, or a free space segment. In FIG. 4C, the structure following FSS1 is a forwarding entry set, in this case FES2. The packing process next checks whether the private free space segment list 96 contains a pointer to a free space segment large enough to hold FES2. In the example of FIG. 4C, the private free space segment list 96 is initially empty, and indicates no free space segment into which FES2 can be copied. The packing process 80 then checks whether FES2 can be copied entirely into the working free space segment, in this case the first free space segment, FSS1. The packing process 80 compares the sizes of FES2 and FSS1, and determines that FES2, having size 3, cannot be fully copied into FSS1, because FSS1 is only of size 2.

Upon determining that FES2 cannot be copied into a free space segment indicated by a pointer in the private free space segment list, and that FES2 cannot be copied entirely into the working free space segment, the packing process 80 next determines whether FES2 can be partially copied into FSS1, without causing FSS1 to cross a block boundary. When the packing process 80 partially copies a forwarding entry set into the working free space segment, it performs a double copy operation using the scratch pad 98. In the example of FIG. 4C, FES2 would occupy words 70c, 70d, and 70e of the forwarding table 70 if partially copied into the working free space segment, crossing over the block boundary BB1. Therefore, in this example, the packing process 80 determines that shifting FES2 into FSS1 would result in FES2 crossing a block boundary BB1. The packing process 80 thus determines that FES2 cannot be partially shifted into FSS1.

Having determined that FES1 cannot be copied or shifted in order to merge FSS1 and FSS2, the packing process 80 adds that portion of the current working free space segment preceding the block boundary to the private free space segment list 96. In this example, the working free space segment was equal to FSS1, and since FSS1 was entirely preceding the block boundary, FSS1 is entirely added to the private free space list. Therefore, in the example of FIG. 4C, the current working free space segment becomes of zero length, and the packing process 80 then locates the next free space segment, and makes the next free space segment into the working free space segment.

As the packing process 80 works through the forwarding table 70, whenever possible, the packing process 80 uses free space segments indicated by the private free space segment 96 list to store forwarding entry sets that are between free space segments.

The packing process 80 continues down through the forwarding table 70, and locates the next free space segment, in this case, FSS2. The packing process 80 makes FSS2 the working free space segment, and then determines whether the next structure following FSS2 is a free space segment or a forwarding entry set. In this case, the packing process 80 determines that forwarding entry set FES3 follows free space segment FSS2 in the forwarding table 70. Repeating the steps described above, the packing process 80 next determines if the private free space segment list 96 indicates a free space segment into which FES3 can be copied. The packing process 80 finds that the private free space segment list 96 contains a pointer to FSS1, and that FSS1 is of sufficient size (2) that FES3 (also having size 2) can be copied into FSS1. The packing process 80 therefore copies FES3 from words 70i and 70j into words 70c and 70d. The packing process 80 then modifies the working free space segment to consist of words 70h, 70i and 70j, having a length of 3 words. The packing process 80 next determines that the forwarding table segment following the working free space segment is a free space segment, in this case FSS3, and the packing process 80 automatically merge FSS3 into the working free space segment, thus creating a new free space segment consisting of words 70h, 70i, 70j, 70k, and 70l, having a length of 5 words.

In this way the packing process 80 continues down the forwarding table 70, creating larger free space segments. In the example of FIG. 4C, free space segments FSS1 of size 2, FSS2 having size 1, and FSS3 having size 3 were combined such that the words 70h, 70i, 70j, 70k, and 70l are all contiguous free space.

Figure 5:
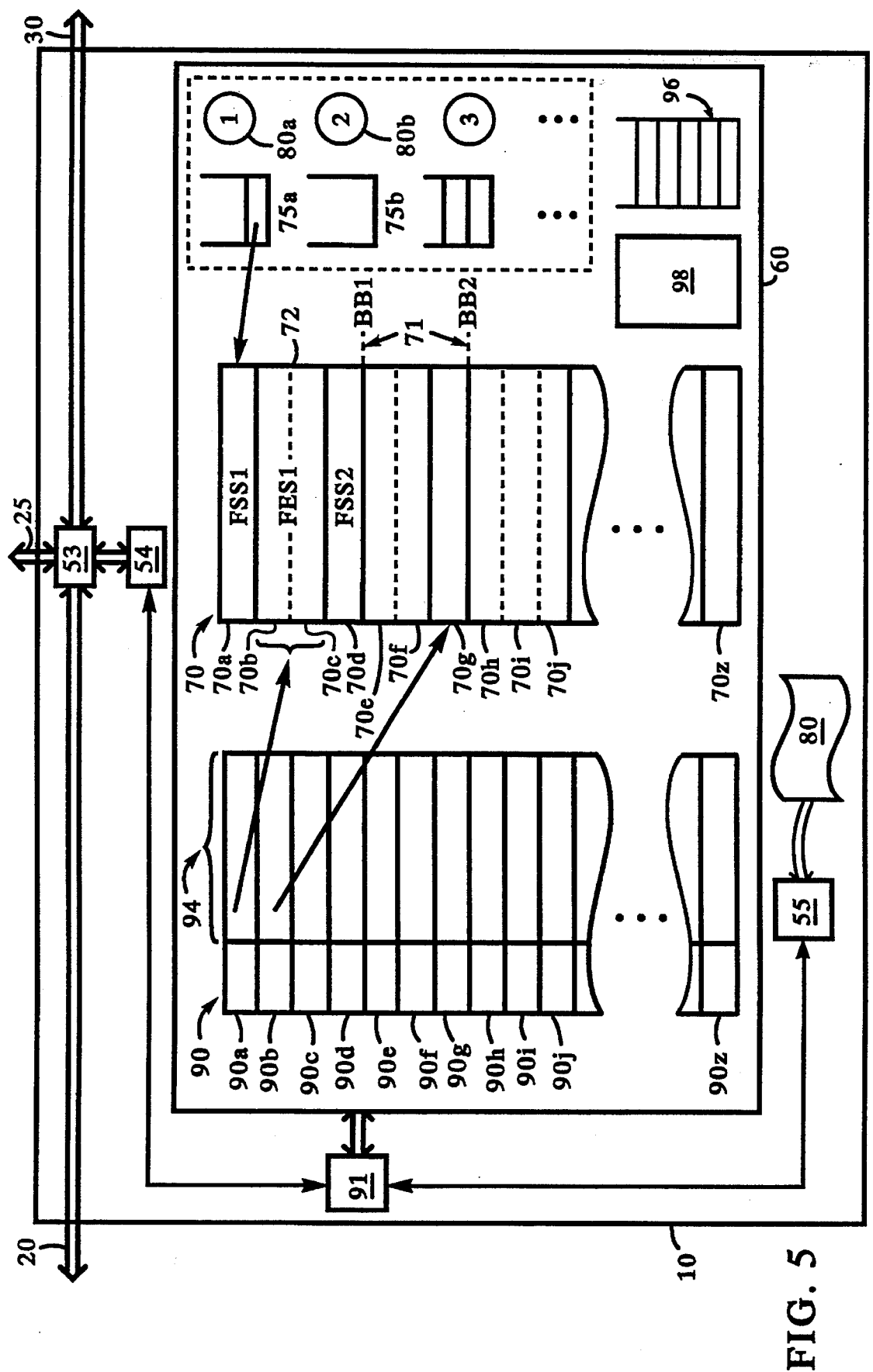
FIG. 5 is a diagram of a second example embodiment of an apparatus for maintaining frame forwarding information.

FIG. 5 shows a second example of an apparatus for maintaining forwarding information within a bridge 10, coupled with LAN segments 20, 25 and 30. The bridge 10 includes a memory 60, a microprocessor 55, a transceiver circuit 53, a frame forwarding circuit 54, a mutual exclusion circuit 91 and a packing process 80. The memory 60 contains the forwarding table 70, a hash table 90, the plurality of free queues 75, the scratch pad 98, and the private free space segment list 96. The hash table 90 contains a plurality of hash table entries 90a, 90b, 90c . . . 90z, each hash table entry having a pointer field 94. The pointer field 94 in each one of hash table entries 90a, 90b, 90c . . . 90z points to one of the forwarding entry sets 72 in the forwarding table 70.

The transceiver circuit 53 is coupled with the frame forwarding circuit 54 and the LAN segments 20, 25 and 30. The frame forwarding circuit 54 is coupled with the transceiver circuit 53, and the mutual exclusion circuit 91. The packing process 80 is a program running on the microprocessor 55, having access to the memory 60 via the microprocessor 55, by way of the mutual exclusion circuit 91. The mutual exclusion circuit 91 is coupled with the memory 60, the microprocessor, and the frame forwarding circuit 54.

During operation of the elements of FIG. 5, the frame forwarding circuit locates the forwarding entry having forwarding information for a station address in a received frame. The frame forwarding circuit 54 applies a hash function to the station address in the received frame, and obtains hash output. The hash output is a hash table index. The hash table index is used by the forwarding circuit 54 to index one of hash table entries 90a, 90b, 90c etc., in the hash table 90. The indexed hash table entry contains a pointer to a forwarding entry set containing the forwarding entry for the station address in the received frame. The first logic process 100 in the forwarding circuit 54 uses the pointer to derive the address of the forwarding entry set, and loads that address into the address register 12 as shown in FIG. 4B. It will be known to one of skill in the art of computer communications that depending on the specific implementation, the pointer may be either an address, or an index into the forwarding table.

Further during operation of the elements of FIG. 5, the packing process combines free space segments within the forwarding table 70. The packing process 80 locates the first free space segment FSS1. The packing process 80 determines that the forwarding table segment following FSS1 is the forwarding entry set FES1. The packing process first checks the private free space segment list 96 for a sufficiently large free space segment into which to copy FES1. In the example, private free space segment list 96 is initially empty, and therefore there is no free space segment within the private free space segment list 96 into which to copy FES1.

The packing process 80 next determines whether FES1 can be copied in its entirety into FSS1. In this example, FES1 is of size 2, and is therefore too large to copy entirely into FSS1, which is of size 1.

The packing process 80 then determines whether FES1 can be partially copied into FSS1, through a double copy operation, without causing FES1 to cross a block boundary 71 in its shifted position. In the example, FES1 can be partially copied into FSS1, resulting in FES1 being in words 70a and 70b, where it does not cross a block boundary. Responsive to this determination, the packing process 80 performs a double copy operation, first copying FES1 into the scratch pad 98, and then write the address of scratch pad 98 into the hash table entry corresponding to FES1, in this case 90*a*. While the packing process 80 is shifting FES1, the frame forwarding circuit 54 accesses FES1 in the scratch pad 98.

After copying FES1 to scratch pad 98, and modifying the pointer field 94 of the hash table entry corresponding to station addresses having forwarding entries in FES1, the packing process 80 performs the second copy of the double copy operation by copying FES1 from scratch pad 98 into words 70*a* and 70*b*. When the copy is complete, the packing process 80 writes a pointer to the new location of FES1, word 70a of the forwarding table 70 in this example, into the hash table entry 90*a*. Subsequently, the frame forwarding circuit 54 accesses FES1 in the words 70*a* and 70*b* within the forwarding table 70.

The mutual exclusion circuit 91 ensures that the frame forwarding circuit 54 cannot access the hash table 90 while the packing process 80 is writing the location of the new forwarding entry set to the pointer field of a hash table entry. In this way, the frame forwarding circuit 54 is prevented from accessing either a partially written hash table entry, or a partially copied forwarding entry set.

Figure 6:
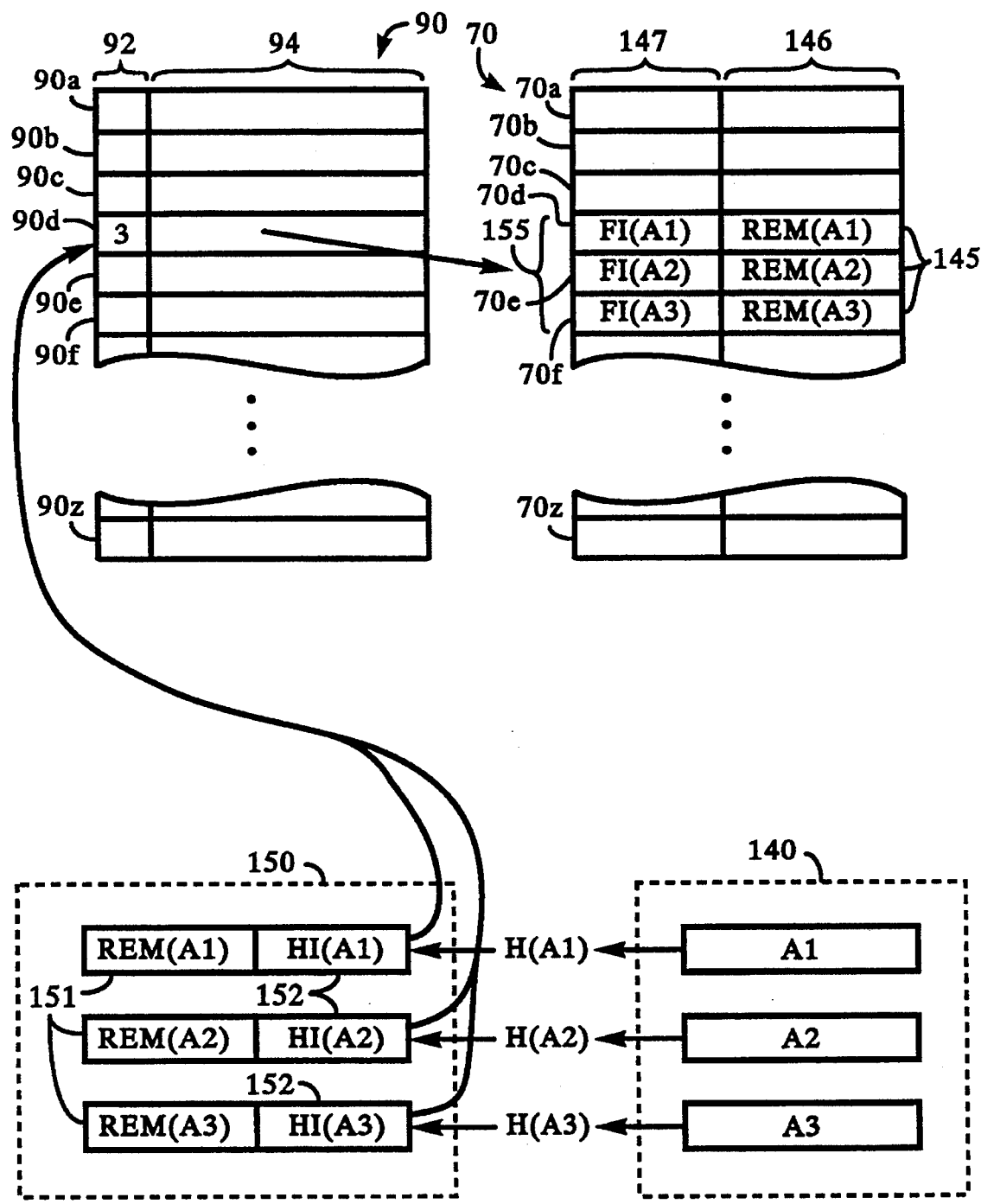
FIG. 6 is a diagram of the relationship of forwarding entries in a forwarding entry set in the second example embodiment.

D. The Relationship of Forwarding Entries within Forwarding Entry Sets, and the Relationship of Hash Table Entries to Forwarding Entry Sets FIG. 6 is a diagram showing the relationship of forwarding entries in a forwarding entry set in the second example embodiment. A set of related addresses 140, is shown consisting of addresses A1, A2, and A3. A set of hash outputs 150, is shown corresponding to the set of related addresses 140, such that hash output H(A1) is the hash output obtained by applying a hash function to the address A1, hash output H(A2) is the hash output obtained by applying the hash function to the address A2, etc.

Hash outputs 150, for the addresses 140, are shown having a remainder field 151 and a hash table index field 152. The hash table index field 152 of the hash outputs 150 are equal for all the related addresses 140, and indicate hash table entry 90*d*. Hash table entry 90*d* includes a pointer field 94 pointing to word 70*d* in the forwarding table 70. The size field 92 in the hash table entry 90*d* indicates the size of the forwarding entry set beginning at word 70*d*, having forwarding entries 145. Each one of forwarding entries 145 has a hash remainder field 146 and a forwarding information field 147. For a given one of forwarding entries 145, the contents of the hash remainder field 146 is equal to the remainder field 151 of the hash output 150 for the specific one of the addresses 140 for which the forwarding information field 147 contains forwarding information.

E. Preferred Configuration of Forwarding Entries within Forwarding Entry Sets

Figure 7A:
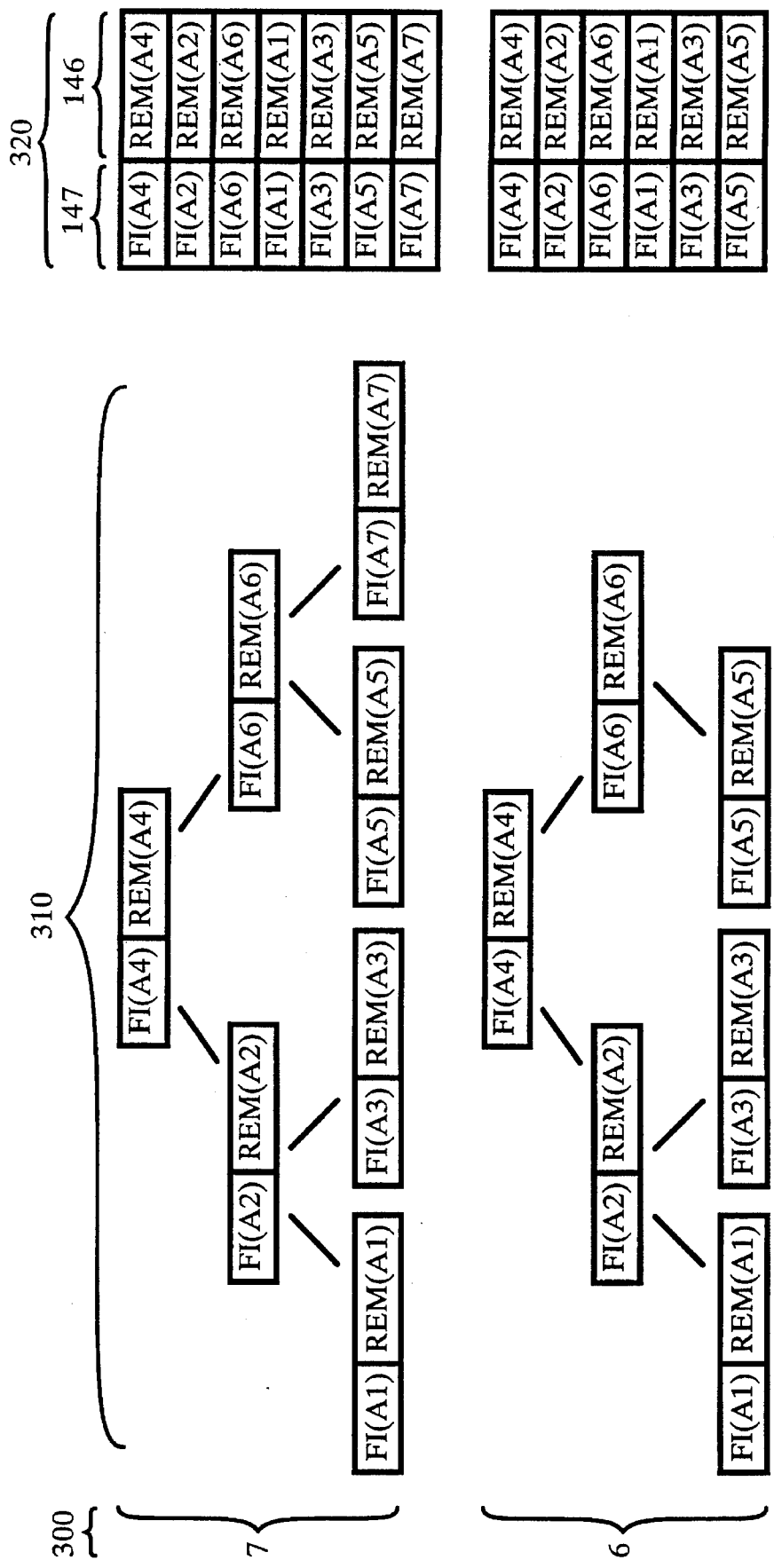
FIGS. 7A and 7B are a diagram of a preferred configuration of forwarding entries within a forwarding entry.
Figure 7B:
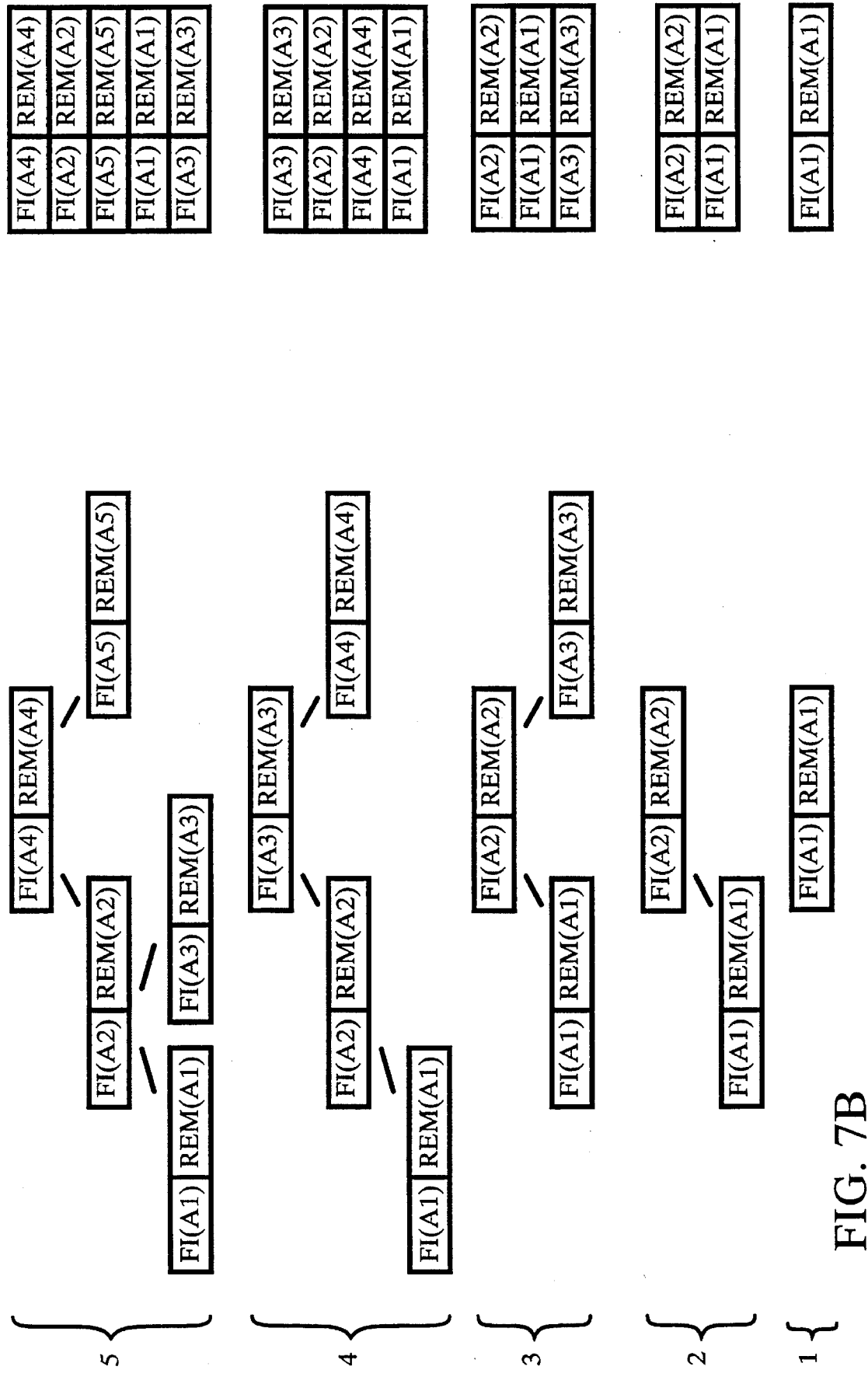

FIGS. 7A and 7B are a diagram showing a preferred configuration of forwarding entries within a forwarding entry set. Each forwarding entry set consists of a balanced binary tree of between one and a maximum number of forwarding entries. The height of a tree is defined to be its maximum level, the length of the longest path from the root to an external node. A binary tree is balanced if the height of the left subtree of every node never differs by more than plus or minus one from the height of its right subtree. Therefore, when a balanced binary tree has N elements, the height of the tree is log (N−1). The height of the tree also defines the worst case number of queries to find a forwarding entry within the tree.

In FIGS. 7A and 7B column 300 shows the forwarding entry set size in terms of forwarding entries, column 310 shows the fully balanced tree for each forwarding entry set, and column 320 shows the arrangement in memory of forwarding entries within each forwarding entry set. The forwarding entries each consist of a remainder field 146, containing the remainder field of the hash output for a given station address, and a forwarding information field 147, containing forwarding information for that given station address. For example, the forwarding entry containing forwarding information for station address A1 has remainder field contents REM(A1), and forwarding information field contents FI(A1). Similarly, the forwarding entry containing forwarding information for station address A2 has a remainder field contents of REM(A2), etc. In the example of FIGS. 7A and 7B, the remainder fields have the following relationship:

REM(A1)<REM(A2)<REM(A3)<REM(A4)<REM(A5)< REM(A6)<REM(A7).

Using the referred configuration of forwarding entries within forwarding entry sets shown in FIGS. 7A and 7B the following steps are performed by the second logic process 102 to locate the forwarding entry containing forwarding information for a given station address A. First, a hash output is obtained by applying a hash function to A. The hash output has a hash index field, and a remainder field. The hash index field is used to locate a hash table entry in the hash table. The location of a forwarding entry set is obtained using a pointer contained in the hash table entry. A search of the forwarding entry set is then performed by traversing the forwarding entry set, comparing the remainder field of the hash output with the remainder field 146 of the forwarding entries in the forwarding entry set. When a match is found, the forwarding entry contains forwarding information for A.

F. Method for Collecting Free Space Segments in a Forwarding Table

Figure 8:
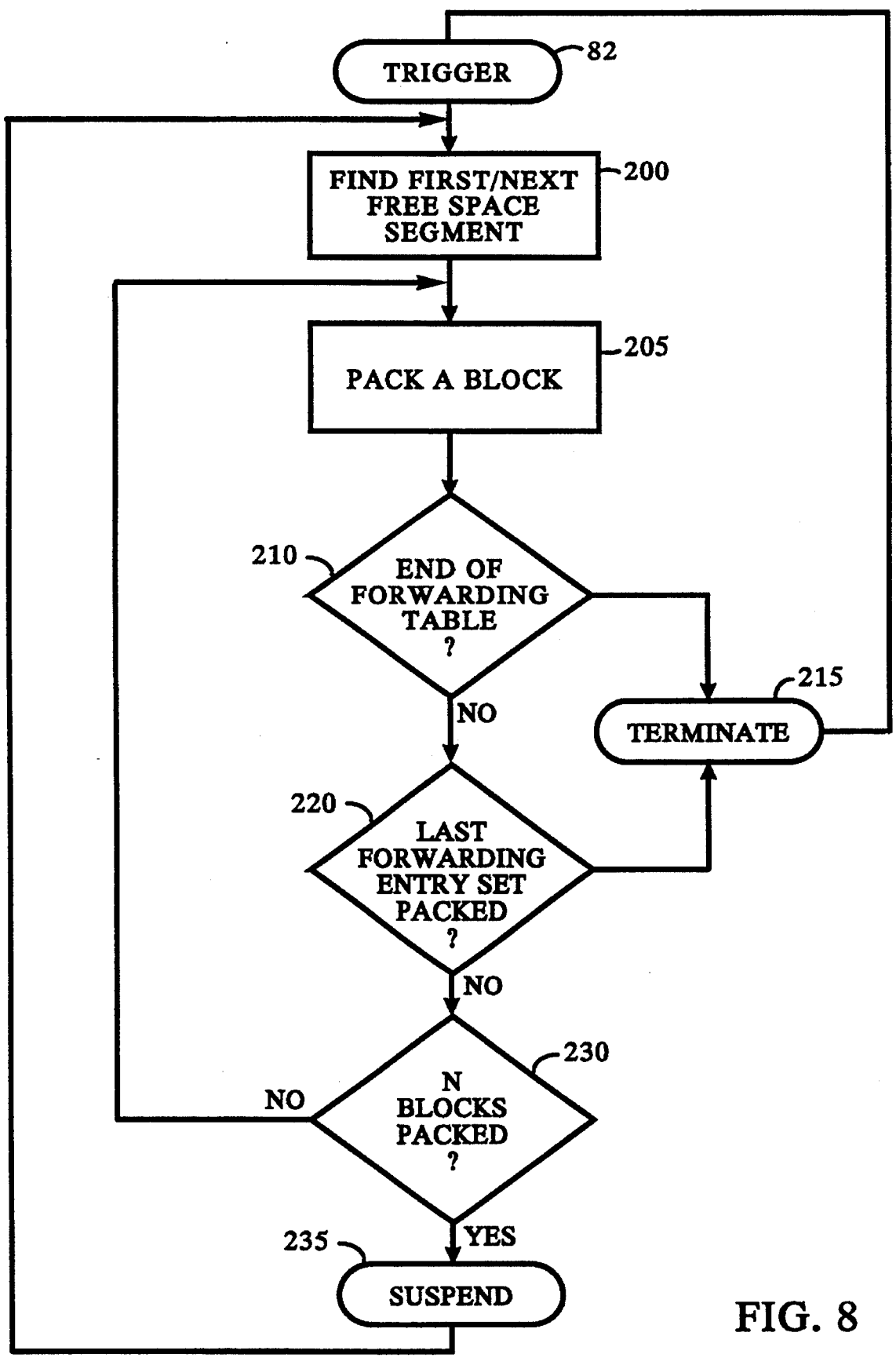
FIG. 8 is a flow chart showing the steps of a method for collecting free space segments.

FIG. 8 is a flow diagram showing the steps of a method for collecting free space segments in a forwarding table. Upon occurrence of a trigger condition 82, the first step 200 of the method is to locate the first free space segment within the forwarding table, and defines this to be the current working free space segment. Following resumption of execution after a suspension condition in step 235, the method continues in step 200 by locating any existing working free space segment, and defining it to be the current working free space segment. Then in step 205, a portion of the forwarding table of predetermined length, for example a block of words, is packed such that consecutive forwarding entry sets within that portion of the forwarding table are made contiguous. It will be evident to one of skill in the art that the predetermined length of words processed in step 205 will vary among different implementations.

In step 210, the method determines whether the end of the forwarding table has been reached. If the end of the forwarding table has been reached, the method terminates in step 215. Following termination of the method, no steps of the method will be executed until another trigger condition 82 has occurred.

If the end of the forwarding table has not been reached, the method next determines in step 220 whether the last forwarding entry set in the forwarding table has been packed. To make the determination in step 220, the method compares the position of the end of the block just packed, with the position of the last forwarding entry set in the forwarding table. If the last forwarding entry set in the forwarding table has been packed, the method terminates in step 215. If it is determined in step 220 that the last forwarding entry set in the forwarding table has not been packed, then the method proceeds to step 230.

In step 230, the method determines whether a predetermined number ('N') of blocks have been packed. If the predetermined number of blocks has been packed, then the method proceeds to step 235, in which the method is suspended to allow other processes to make progress and use any shared resources such as the CPU. Following suspension, the method will automatically resume at step 200 following other processes making progress and using the shared resources. Otherwise, if the predetermined number of blocks has not been packed, the method iterates steps 205, 210, and 220 until it either suspends in step 235, or terminates in step 215.

Figure 9:
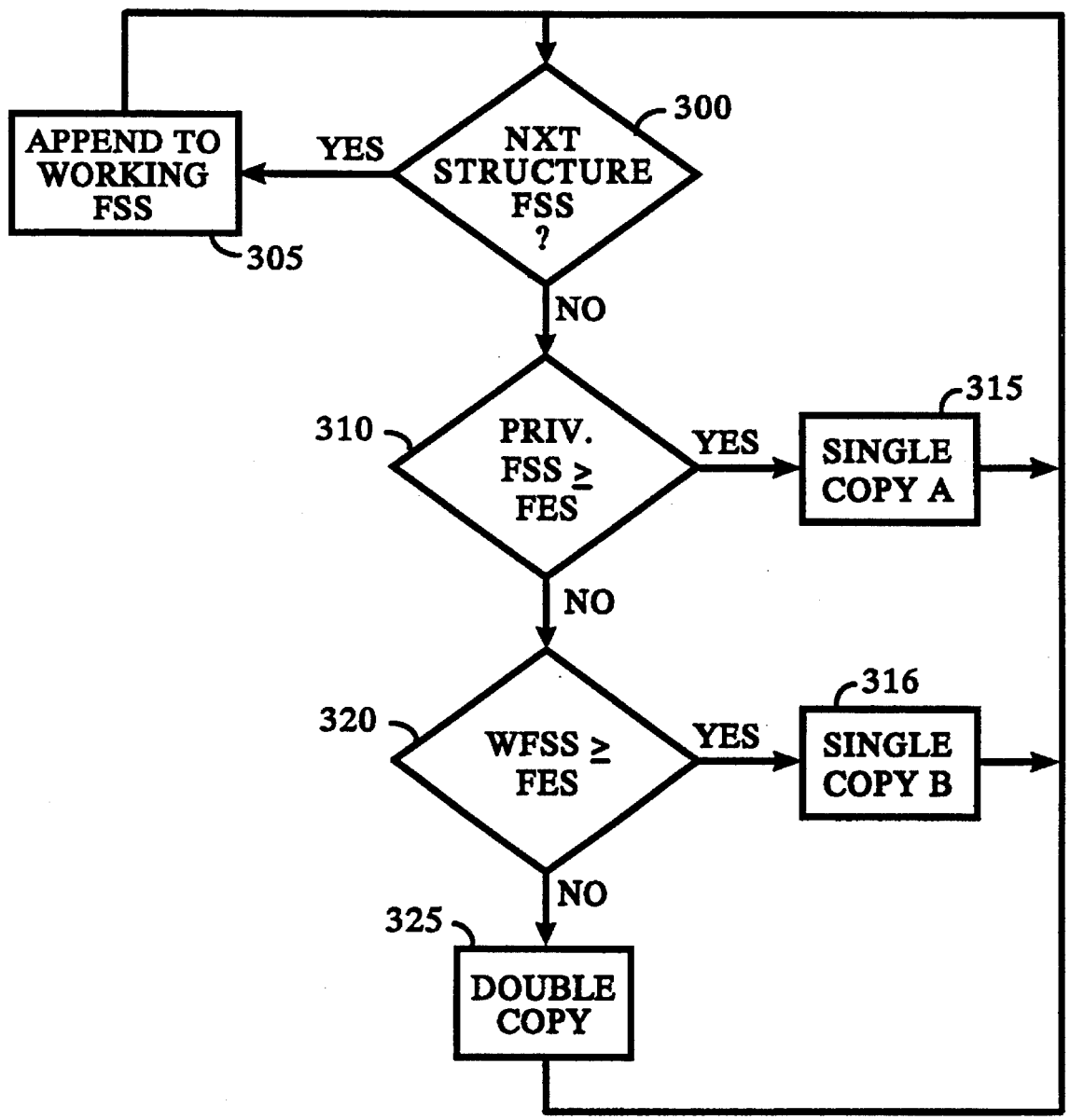
FIG. 9 is a flow chart showing the steps of an example embodiment of a method for collecting free space.

FIG. 9 shows an example embodiment of the sub-steps within step 205 of FIG. 8. In step 300 the method determines whether the forwarding table segment following the working free space segment defined in step 200 is a free space segment. If step 300 determines that the forwarding table segment following the working free space segment defined in step 200 is a free space segment, then the method proceeds to step 305. In step 305, the free space segment following the working free space segment defined in step 200 is appended (or "merged") with the working free space segment defined in step 200. The working free space segment thus consists of the working free space segment defined in step 200 together with the free space segment following the working free space segment defined in step 200.

If step 300 determines that the forwarding table segment following the working free space segment defined in step 200 is not a free space segment, and is therefore a forwarding entry set, the working free space segment consists of the working free space segment defined in step 200, and the method proceeds to step 310. In step 310, the method determines whether there is a free space segment within the private free space list of sufficient size to store the forwarding entry set. If there is a free space segment within the private free space list of sufficient size to store the forwarding entry set, the method proceeds to step 315. If there is not a free space segment within the private free space list of sufficient size to store the forwarding entry set, the method proceeds to step 320.

In step 315, a single copy operation is performed. First the forwarding entry set is copied to a free space segment within the private free space segment list of sufficient size to store the forwarding entry set. During the copy, the forwarding ASIC makes forwarding decisions based on the contents of the forwarding entry set by referencing the forwarding entry set in its initial position. Subsequent to the copy, the forwarding ASIC references forwarding table entries in the forwarding entry set by referencing the forwarding entry set in its new position as stored within the free space segment from the private free space segment list.

Following step 315, the method then continues iteratively with step 300, repeating steps 300, 305, 310, 315, 320, 316, and 325 as needed until a predetermined number of words within the forwarding table, for example a block of words, has been packed such that consecutive forwarding entry sets are made contiguous within the block.

In step 320, the method determines whether the current working free space segment is of sufficient size to store the forwarding entry set. If step 320 determines that the current working free space segment is of sufficient size to store the forwarding entry, the method proceeds to step 316. If step 320 determines that the current working free space segment is not of sufficient size to store the forwarding entry, the method proceeds to step 325.

In step 316, a single copy operation is performed. The forwarding entry set is completely copied into the working free space segment. During the copy, the forwarding ASIC references forwarding entries in the forwarding entry set by accessing the forwarding entry set in its initial position. Subsequent to the copy, forwarding ASIC references of the forwarding entry set reference the forwarding entry set in its new position as stored within the working free space segment.

Following step 316, the method then continues iteratively with step 300, repeating steps 300, 305, 310, 315, 320, 316, and 325 as needed until a predetermined number of words within the forwarding table, for example a block of words, has been packed such that consecutive forwarding entry sets are made contiguous within the block.

In step 325, a double copy operation is performed. A first copy within step 325 by copying the forwarding entry set into a scratch pad. While the forwarding entry set is being copied into the scratch pad, the forwarding ASIC makes forwarding decisions based on forwarding entries within the forwarding entry set by referencing the forwarding entry set in its initial position. After the forwarding entry set is completely copied to the scratch pad, the forwarding ASIC makes forwarding decisions referencing the forwarding entry set by accessing the forwarding entry set within the scratch pad.

Next, a second copy is performed in step 325 by copying the forwarding entry set to a new position beginning at the start of the working free space segment, and in the process over-writing some of the original location of the forwarding entry set. During the second copy, the forwarding ASIC makes forwarding decisions referencing the forwarding entry set by accessing the forwarding entry set within the scratch pad. Subsequent to the completion of the second copy, the forwarding ASIC makes forwarding decisions referencing the forwarding entry set by accessing the forwarding entry set at its new position beginning at the start of the working free space segment. Following step 325, the method then continues iteratively with step 300, repeating steps 300, 305, 310, 315, 320, 316, and 325 as needed until a predetermined number of words within the forwarding table, for example a block of words, has been packed such that consecutive forwarding entry sets are made contiguous within the block.

Figure 10:
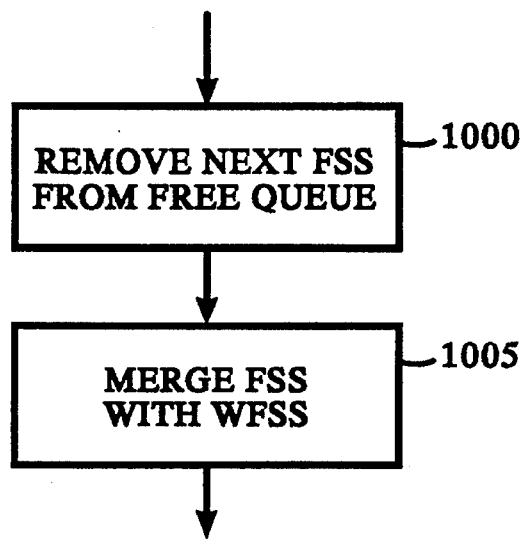
FIG. 10 shows an example embodiment of substeps within step 305 of the method shown in FIG. 9.

FIG. 10 shows an example of substeps within step 305 of the method shown in FIG. 9. In FIG. 10, the method first removes the free space segment following the current working free space segment from its free queue in step 1000. Following step 1000, the method then merges the free space segment following the current working free space segment with the current working free space segment in step 1005.

Figure 11:
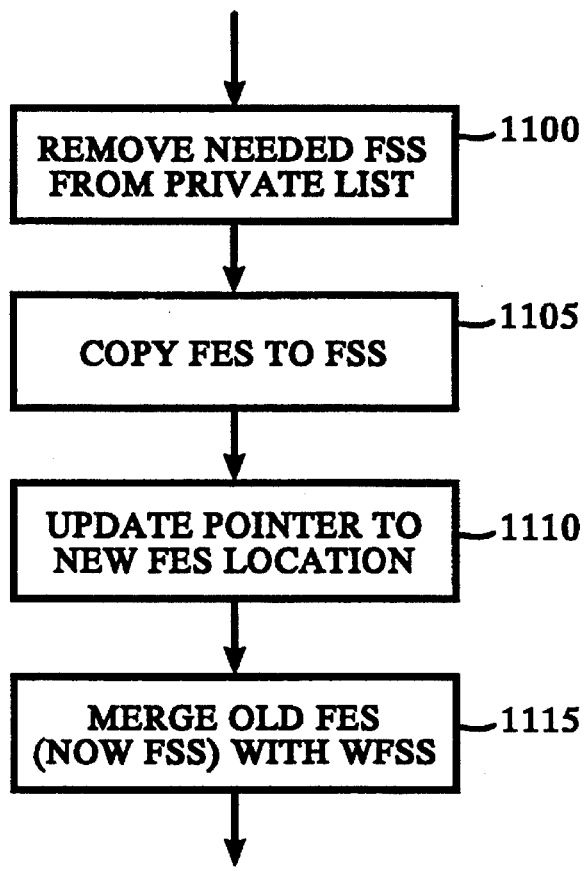
FIG. 11 Figure is an example embodiment of substeps within step 315 of the method shown in FIG. 9.

FIG. 11 is an example of substeps within step 315 of the method shown in FIG. 9. In step 1100 of FIG. 11, the free space segment having size sufficient to hold the forwarding entry set to be moved is removed from the private free space list. Following step 1100, the method copies the forwarding entry set to be moved into the free space segment removed from the private free space list in step 1100. Next, in step 1110, the method updates a pointer with the associated hash table entry for the moved forwarding entry set to point to the forwarding entry set at its new location in the forwarding table. In step 1115, the method merges the space from the initial location of the moved forwarding entry set into the working free space segment.

Figure 12:
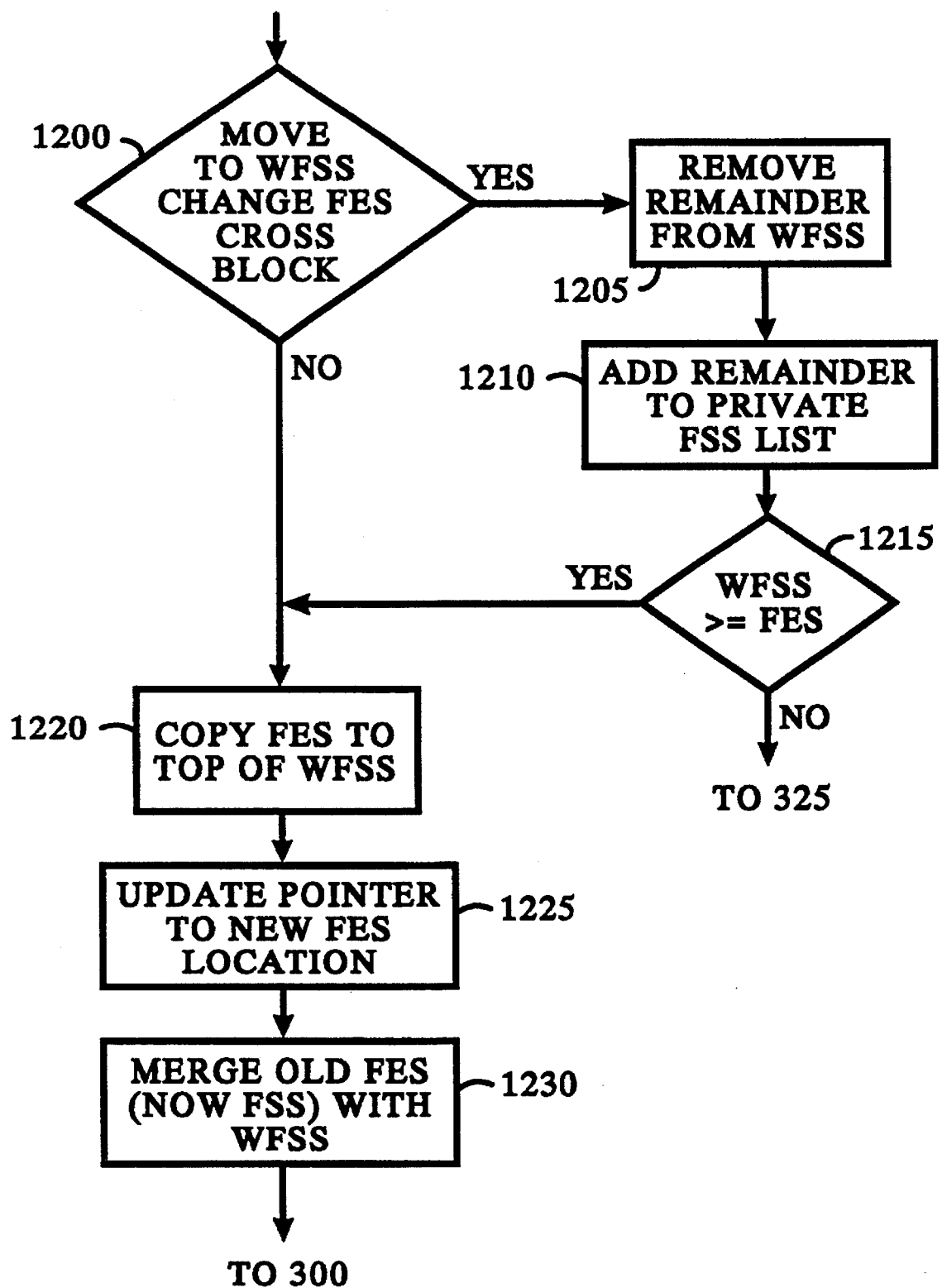
FIG. 12 is an sample embodiment of substeps within step 316 of the method shown in FIG. 9.

FIG. 12 is an example of substeps within step 316 of the method shown in FIG. 9. In step 1200 of FIG. 12, the method determines whether moving the forwarding entry set to be moved into the top of the current working free space segment would cause the forwarding entry set to cross a block boundary. If the method determines that moving the forwarding entry set to be moved into the top of the current working free space segment would cause the forwarding entry set to cross a block boundary, the method continues with step 1205. If the method determines that moving the forwarding entry set to be moved into the top of the current working free space segment would not cause the forwarding entry set to cross a block boundary, the method continues with step 1220.

In step 1205 of FIG. 12, the method removes the remaining portion of the current working free space segment that precedes the block boundary from the working free space segment. In step 1210, the method adds the portion preceding the block boundary removed from the working free space segment in step 1205 to the private free space list. In step 1215 of FIG. 12, the method determines whether the top of the current working free space segment, without the portion preceding the block boundary, is of sufficient size to store the forwarding entry set to be moved. If the method determines that the top of the current working free space segment is of sufficient size to store the forwarding entry set to be moved, the method continues with step 1220. If the method determines that the top of the current working free space segment is not of sufficient size to store the forwarding entry set to be moved, the method continues with step 325 of FIG. 9.

In step 1220 of FIG. 12, the method copies the forwarding entry set to be moved into the top of the current working free space segment. Following step 1220, in step 1225 the method updates a pointer within the hash table entry associated with the moved forwarding entry set to point to the new location of the moved forwarding entry set. Next, in step 1230, the method merges the free space from the previous location of the moved forwarding entry set into the working free space segment. The method then continues after step 1230 with step 300 of FIG. 9.

Figure 13:
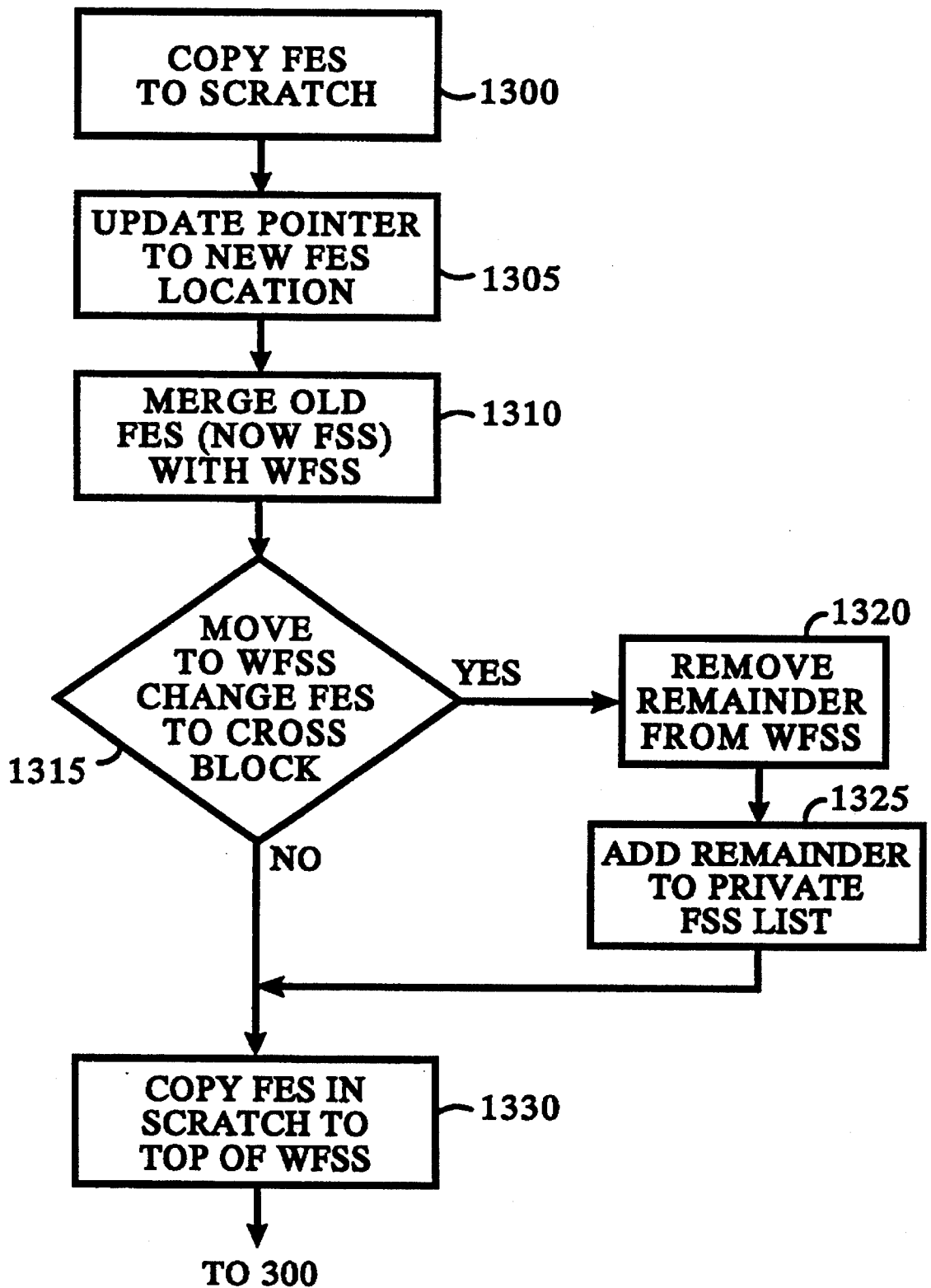
FIG. 13 is an example of substeps within step 325 of the method shown in FIG. 9.

FIG. 13 is an example of substeps within step 325 of the method shown in FIG. 9. In step 1300 of FIG. 13, the method copies the forwarding entry set to be moved to a scratch pad. Following step 1300, in step 1305, the method then updates a pointer in the hash table entry associated with the forwarding entry set to be moved to point to the forwarding entry set to be moved within the scratch pad.

Next, in step 1310 of FIG. 13, the method merges the previous location of the forwarding entry set to be moved, into the current working free space segment. After step 1310, the method determines in step 1315 whether copying the forwarding entry set to be moved from the scratch pad to the current working free space segment will cause the forwarding entry set to cross a block boundary. If copying the forwarding entry set to be moved to the current working free space segment would cause the forwarding entry set to cross a block boundary, the method continues with step 1320. If not, the method continues with step 1330.

In step 1320 of FIG. 13, the method removes the remainder of the current working free space segment preceding the block boundary from the current working free space segment. After step 1320, in step 1325, the method adds the remainder of the current working free space segment preceding the block boundary to the private free space segment list. The method continues following step 1325 with step 1330.

In step 1330 of the method shown in FIG. 13, the forwarding entry set to be moved is copied from the scratch pad to the top of the working forwarding entry set. The method then continues with step 300 as shown in FIG. 9.

It is to be understood that the invention is not necessarily limited to the particular embodiment shown herein. The invention may be adapted to a wide variety of information management systems. It is also to be understood that various adaptations and modifications may be made within the spirit and scope of the invention.

What is claimed is:

1. An apparatus for free space management in a forwarding database, comprising:

a forwarding table having zero or more forwarding entry sets of different sizes, and zero or more free space segments, each said free space segment having a size;

a packing process, having read and write access to said forwarding table and responsive to a trigger condition, for locating a first free space segment of a first size, and for moving one or more forwarding entry sets following said first free space segment in order to create new free space segment of a second size, said second size greater than said first size;

a plurality of free queues, each one of said plurality of free queues having zero or more queue elements indicating free space segments of size equal to a free space segment size associated with said free queue;

a plurality of local area network (LAN) segments;

a transceiver circuit coupled with said local area network segments, for transmitting frames onto and receiving frames from said local area network segments;

a frame forwarding circuit, coupled with said transceiver circuit, for making frame forwarding decisions based on the contents of said received frames and the contents of said forwarding table, said frame forwarding circuit processing forwarding entry sets that do not cross block boundaries within said forwarding table.

2. The apparatus of claim 1 said frame forwarding circuit further comprising:

a memory address register, for addressing said forwarding entry sets in said forwarding table;

a first logic process, having read and write access to said memory address register through a first logic path, said first logic path having a first bit width, said first bit width sufficient to address all locations in said forwarding table, and said first logic process locating a first forwarding entry set during a forwarding decision; and a second logic process, having read and write access to said memory address register through a second logic path, said second logic path having a second bit width, said second bit width sufficient to address a block of locations in said forwarding table, and said second logic process locating a forwarding entry within said first forwarding entry set during, said forwarding decision.

3. The apparatus as in claim 1, further comprising:

a scratch pad memory area, accessible to reads and writes by said packing process, for temporary storage of a forwarding entry set; and a private free space list, consisting of free space segments within said forwarding table not indicated by said elements in said plurality of free queues, and maintained by said packing process.

4. The apparatus as in claim 3 wherein said packing process adds a free space segment to said private free space list when said packing process determines said free space segment is of insufficient size to store one of said one or more forwarding entry sets following said first free space segment.

5. The apparatus as in claim 4, wherein said packing process determines said free space segment is of insufficient size to store one of said one or more forwarding entry sets following said first free space segment when the result of storing said one of said one or more forwarding entry sets following said first free space segment into said free space segment would cause said one of said one or more forwarding entry sets to cross a block boundary.

6. The apparatus as in claim 4, wherein said packing process selects one of said free space segments within said private free space list, said free space segment having sufficient size to store one of said one or more forwarding entry sets following said first free space segment, said packing process further moving said one of said one or more forwarding entry sets following said first free space segment into said one of said free space segments within said private free space list of sufficient size to store said one of said one or more forwarding entry sets using a first single copy operation.

7. The apparatus as in claim 6 wherein during said first single copy operation said frame forwarding circuit makes forwarding decisions based on the contents of said one of said one or more forwarding entry sets by accessing said one of said one or more forwarding entry sets in its original position in said forwarding table, and subsequent to said first single copy operation said frame forwarding circuit makes forwarding decisions based on the contents of said one of said one or more forwarding entry sets by accessing said one of said one or more forwarding entry sets in its new position within said one of said free space segments within said private free space list.

8. The apparatus as in claim 4, wherein said packing process moves one of said one or more forwarding entry sets following said first free space segment entirely into said first free space segment, using a second single copy operation, when both said first free space segment is of sufficient size to store said one of said one or more forwarding entry sets following said first free space segment, and said private free space list contains no free space segment of sufficient size to store said one of said one or more forwarding entry sets following said first free space segment.

9. The apparatus as in claim 8 wherein during said second single copy operation said frame forwarding circuit makes forwarding decisions based on the contents of said one of said one or more forwarding entry sets by accessing said one of said one or more forwarding entry sets in its original position within said forwarding table, and subsequent to said second single copy operation said frame forwarding circuit makes forwarding decisions based on the contents of said one or said one or more forwarding entry sets by accessing said one of said one or more forwarding entry sets in its new position within said first free space segment.

10. The apparatus as in claim 4 wherein said packing process moves one of said one or more forwarding entry sets following said first free space segment partially into said first free space segment, using a double copy operation, when said first free space segment is of insufficient size to store said one of said one or more forwarding entry sets following said first free space segment, and said private free space list contains no free space segment of sufficient size to store said one of said one or more forwarding entry sets following said first free space segment, said double copy operation including first copying said one of said one or more forwarding entry sets following said first free space segment into said scratch pad, and then copying said one of said one or more forwarding entry sets following said first free space segment partially into said first free space segment and partially into the previous location of said one of said one or more forwarding entry sets following said first free space segment.

11. The apparatus as in claim 10 wherein during said double copy operation said frame forwarding circuit makes forwarding decisions based on the contents of said one of said one or more forwarding entry sets by accessing said one of said one or more forwarding entry sets in said scratch pad after said one of said one or more forwarding entry sets is copied to said scratch pad until said one of said one or more forwarding entry sets is copied back to said forwarding table.

12. An apparatus for free space management in a forwarding database, comprising:

a forwarding table having zero or more forwarding entry sets of different sizes, and zero or more free space segments, each said free space segment having a size;

a packing process, having read and write access to said forwarding table, for locating a first free space segment of a first size, and for moving one or more forwarding entry sets following said first free space segment in order to create a new free space segment of a second size, said second size greater than said first size, and such that said moving said one or more forwarding entry sets does not cause any one of said one or more forwarding entry sets to cross a block boundary;

a frame forwarding circuit, coupled to a plurality of local area network segments and said forwarding table, for making a frame forwarding decision responsive to a received frame and the contents of said forwarding table, said frame forwarding circuit including a forwarding entry locating logic process, said forwarding entry locating logic process addressing locations in said forwarding table through a logic path, said logic path having a bit width sufficient to address a block of locations in said forwarding table, and said forwarding entry locating logic process locating a forwarding entry within a predetermined forwarding entry set during said frame forwarding decision.

\* \* \* \* \*